United States Patent [19]
Sato

[11] Patent Number: 5,757,555
[45] Date of Patent: May 26, 1998

[54] INTERNAL FOCUSING TYPE TELEPHOTO LENS

[75] Inventor: Susumu Sato, Chiba, Japan

[73] Assignee: Nikon Corporation, Tokyo, Japan

[21] Appl. No.: 755,899

[22] Filed: Nov. 25, 1996

[30] Foreign Application Priority Data

Nov. 24, 1995 [JP] Japan ................. 7-329867

[51] Int. Cl.$^6$ ............... G02B 15/14; G02B 27/64
[52] U.S. Cl. ............. 359/684; 359/557; 359/690; 359/691
[58] Field of Search ................. 359/557, 684, 359/690, 691

[56] References Cited

U.S. PATENT DOCUMENTS

| | | | |
|---|---|---|---|
| 4,810,071 | 3/1989 | Tsuchida et al. | 359/690 |
| 5,168,402 | 12/1992 | Mihara | 359/684 |
| 5,325,233 | 6/1994 | Nakatsuji et al. | 359/684 |
| 5,528,423 | 6/1996 | Arimoto et al. | 359/684 |
| 5,528,427 | 6/1996 | Tanaka et al. | 359/684 |
| 5,579,171 | 11/1996 | Suzuki et al. | 359/557 |
| 5,633,756 | 5/1997 | Kaneda et al. | 359/557 |
| 5,666,230 | 9/1997 | Sato | 359/684 |

Primary Examiner—David C. Nelms
Assistant Examiner—Evelyn A. Lester
Attorney, Agent, or Firm—Oliff & Berridge, PLC

[57] ABSTRACT

An internal focusing type telephoto lens which, while maintaining a superior optical performance, has a small effective aperture of the focusing lens as well as a small focusing movement amount. The lens includes first, second and third lens groups designated as G1, G2 and G3, respectively. The internal focusing type telephoto lens performs focusing by moving the second lens group G2 along the optical axis. The first lens group G1 has a positive refractive power, the second lens group G2 has a negative refractive power, and the third lens group G3 has a positive refractive power. The first lens group G1 and the second lens group G2 form a nearly afocal system. The first lens group G1 has, at the object side, a negative meniscus lens L11 having a convex surface that faces towards the object side.

39 Claims, 21 Drawing Sheets

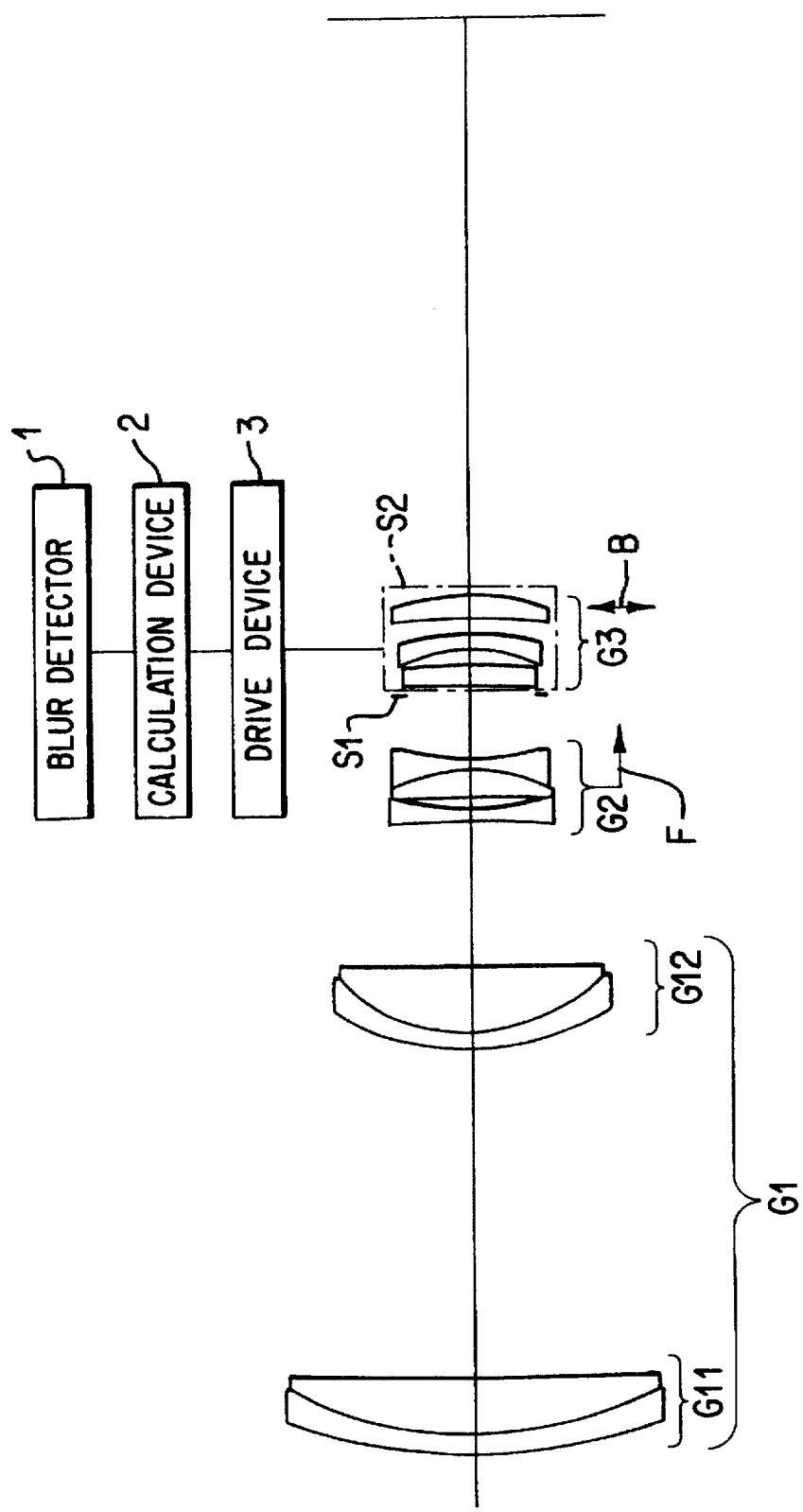

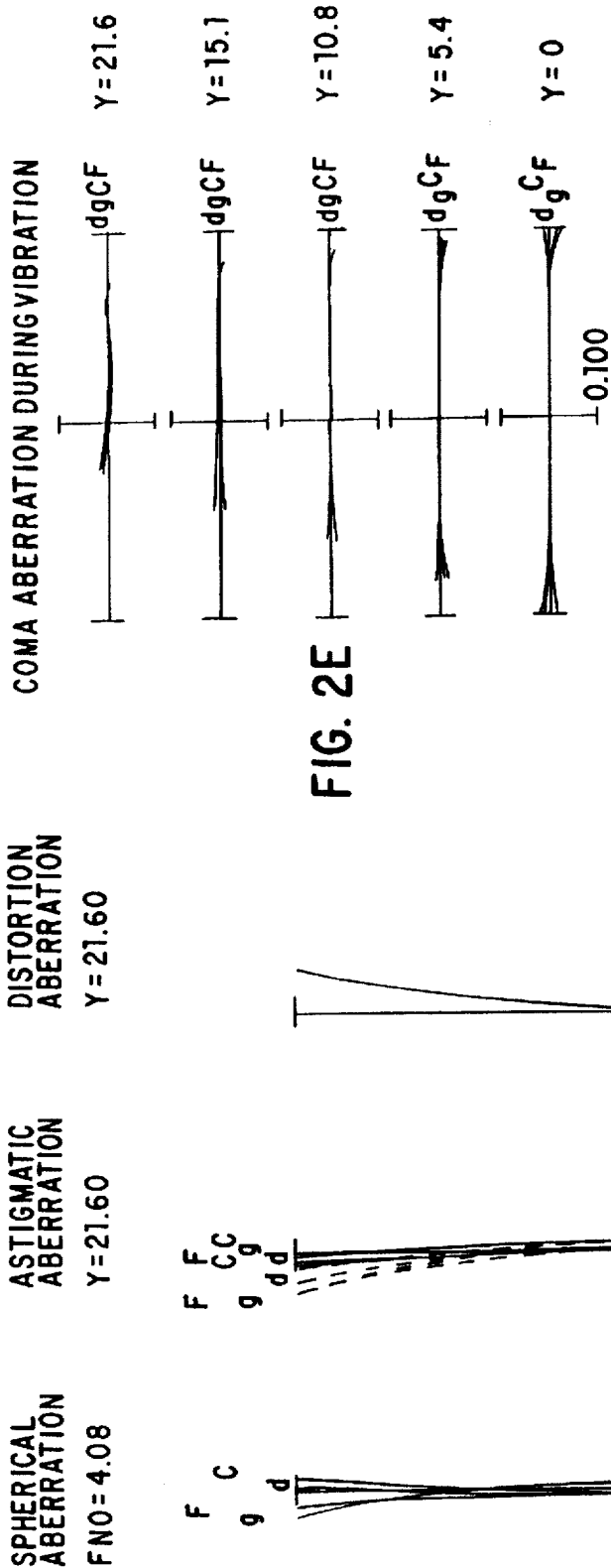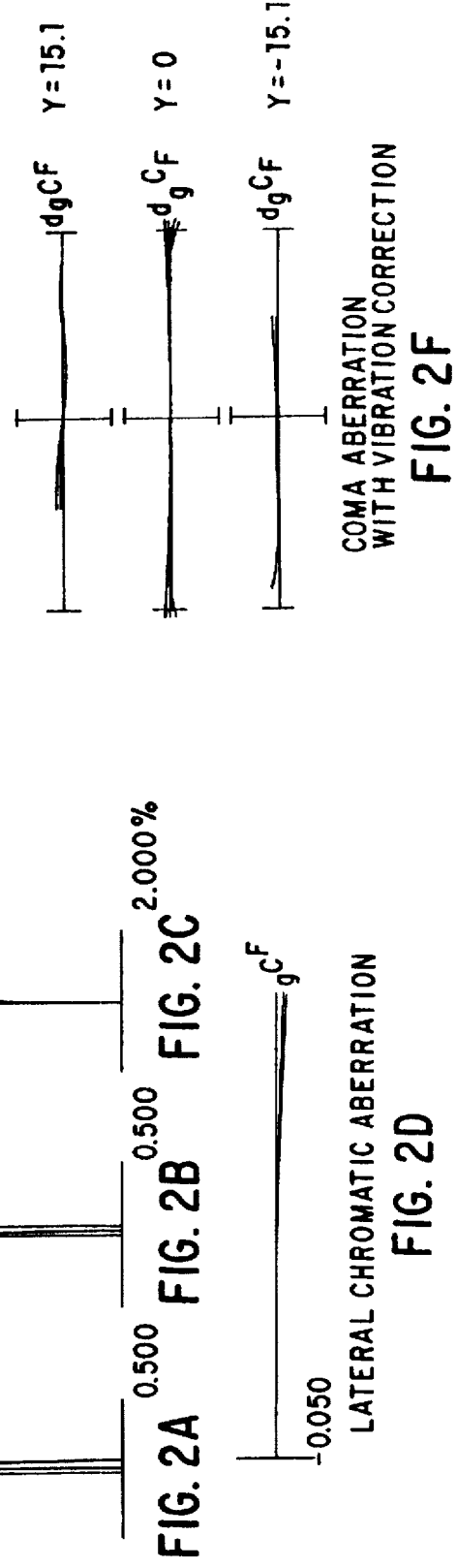

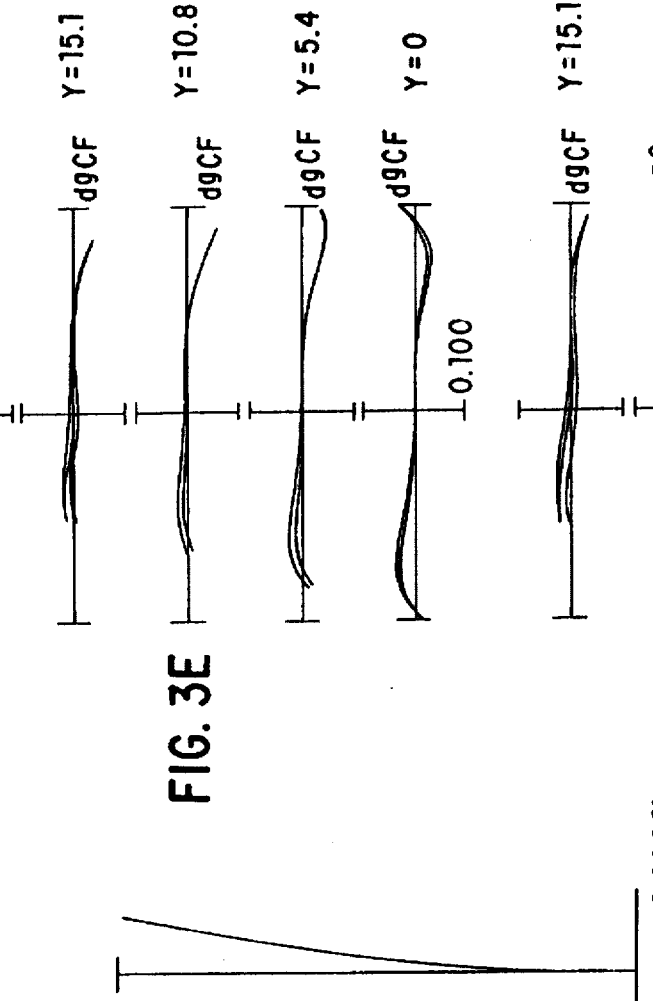
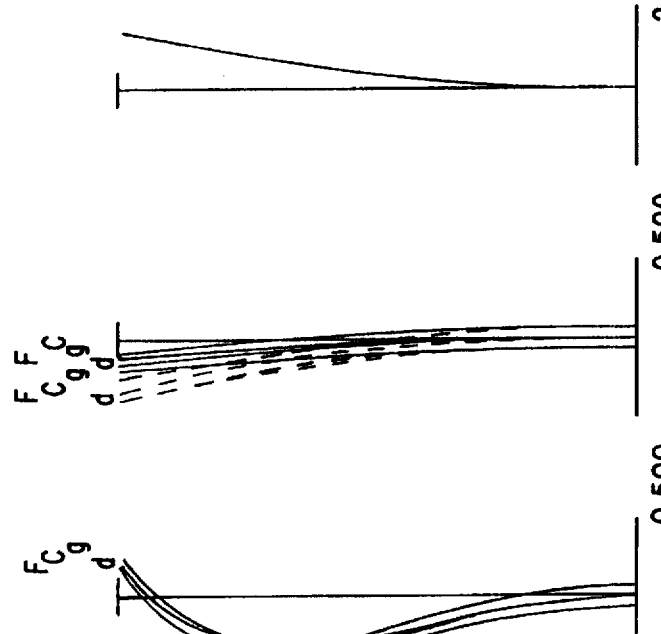
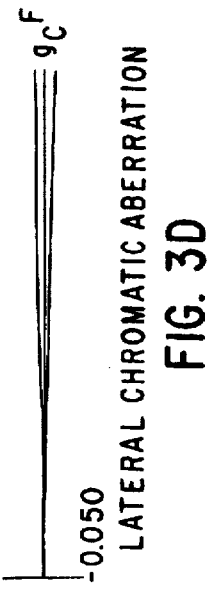
FIG. 3A SPHERICAL ABERRATION NA=0.12
FIG. 3B ASTIGMATIC ABERRATION Y=21.60
FIG. 3C DISTORATION ABERRATION Y=21.60
FIG. 3D LATERAL CHROMATIC ABERRATION
FIG. 3E COMA ABERRATION DURING VIBRATION
FIG. 3F COMA ABERRATION WITH VIBRATION CORRECTION

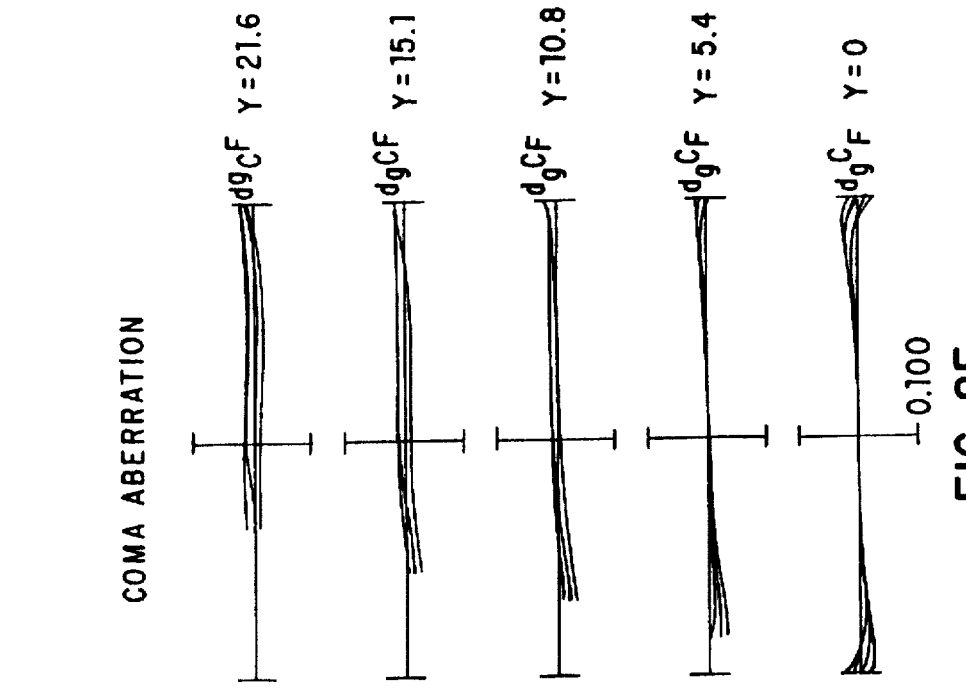
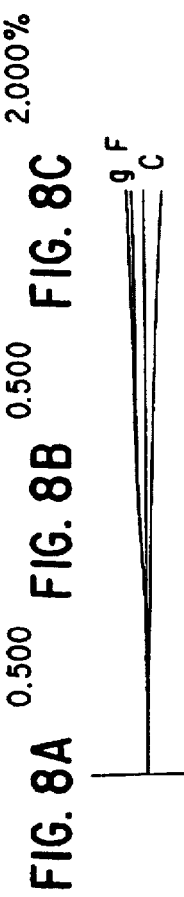

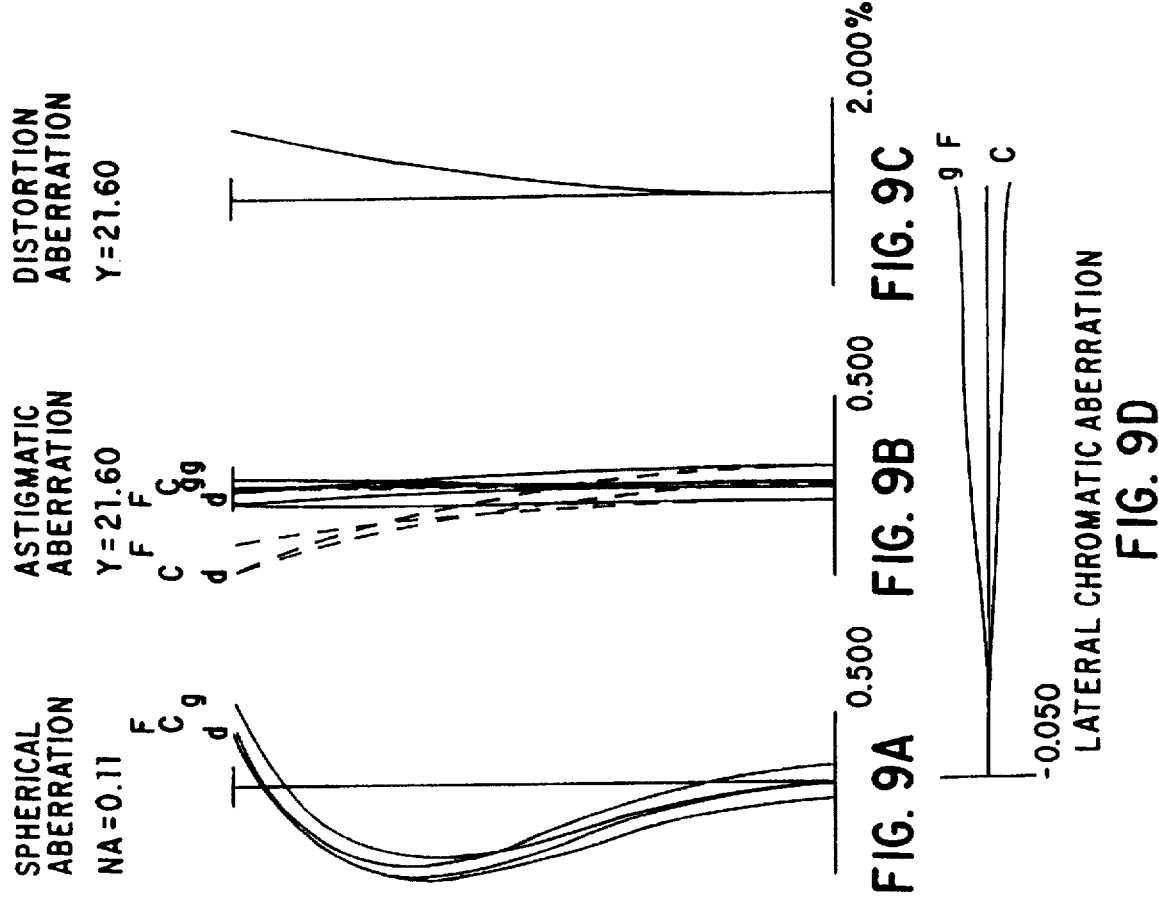

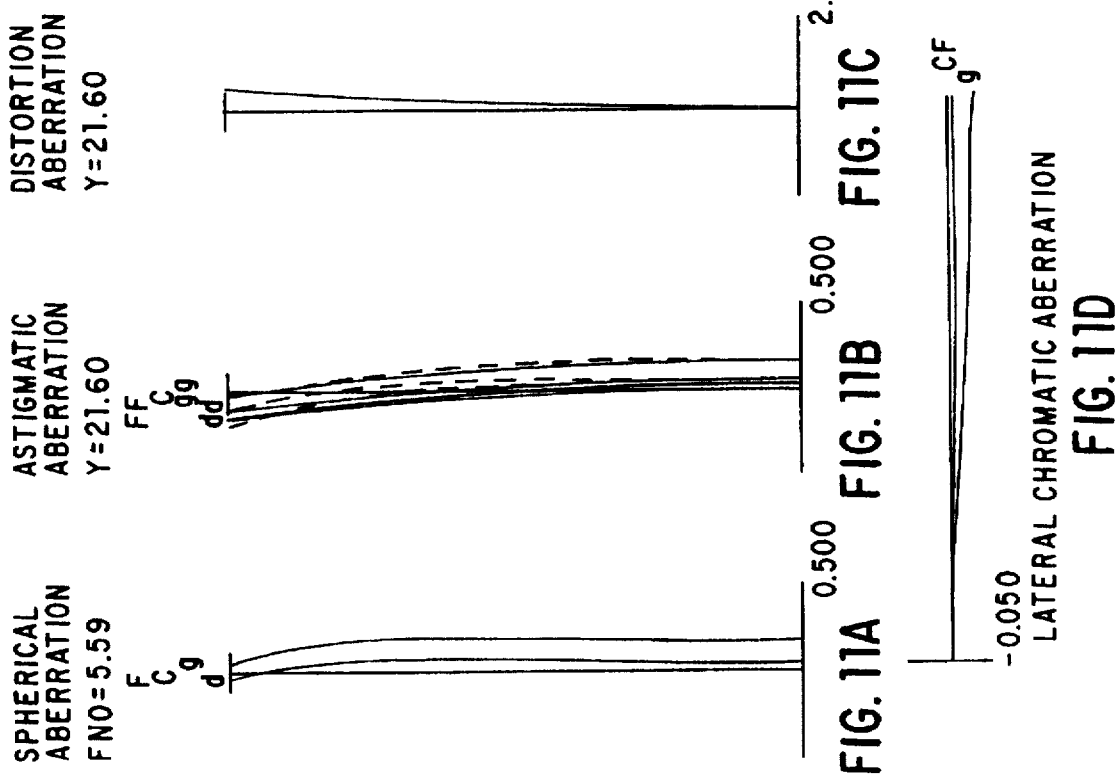

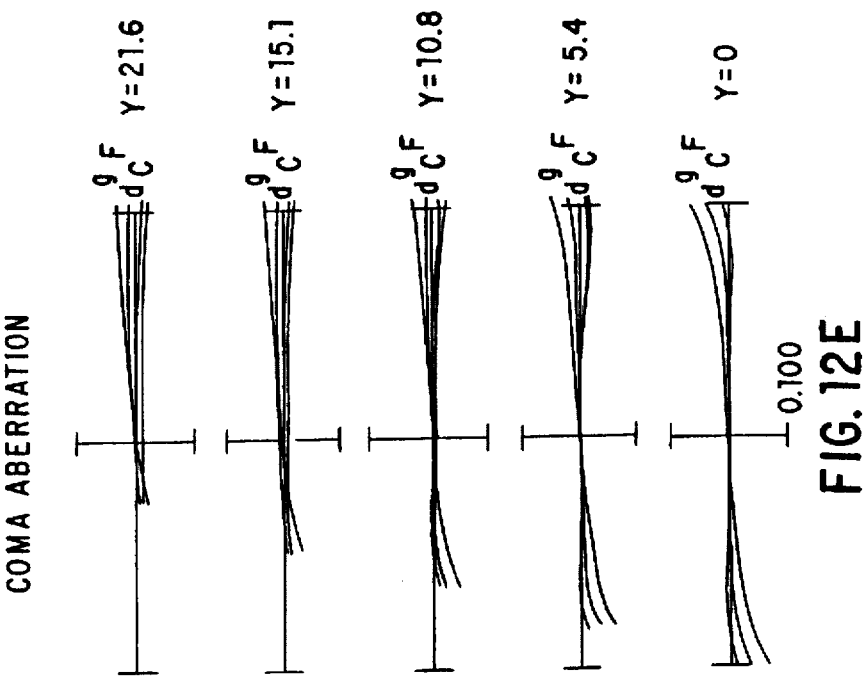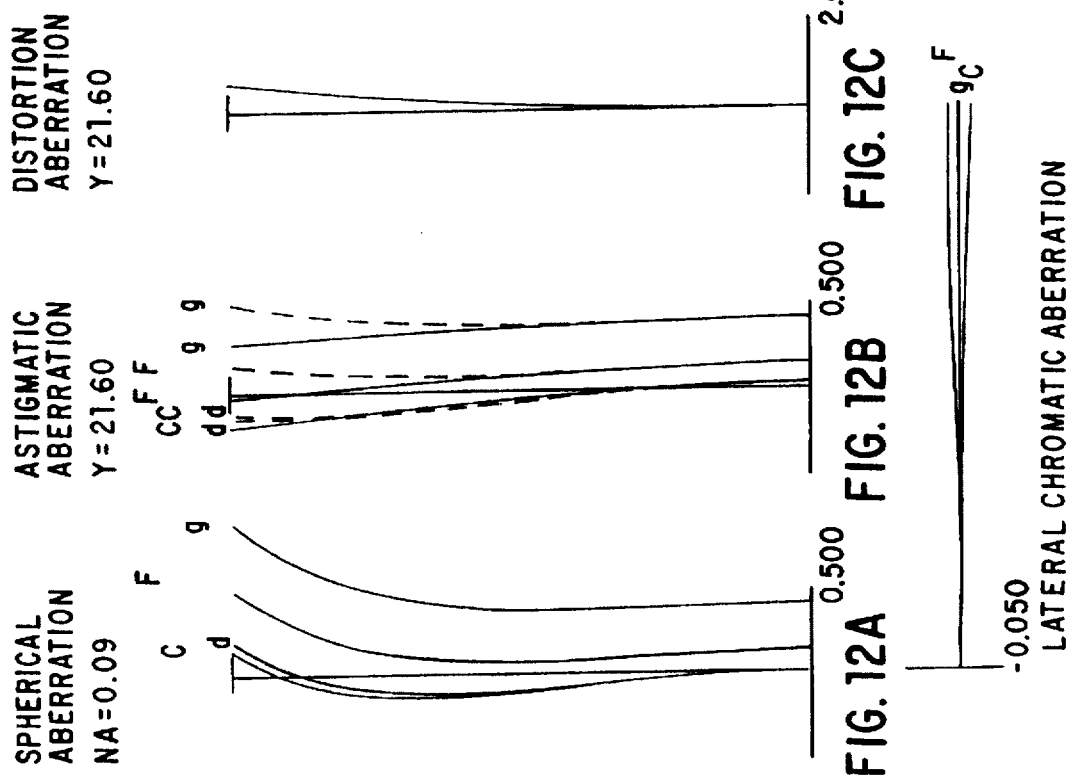

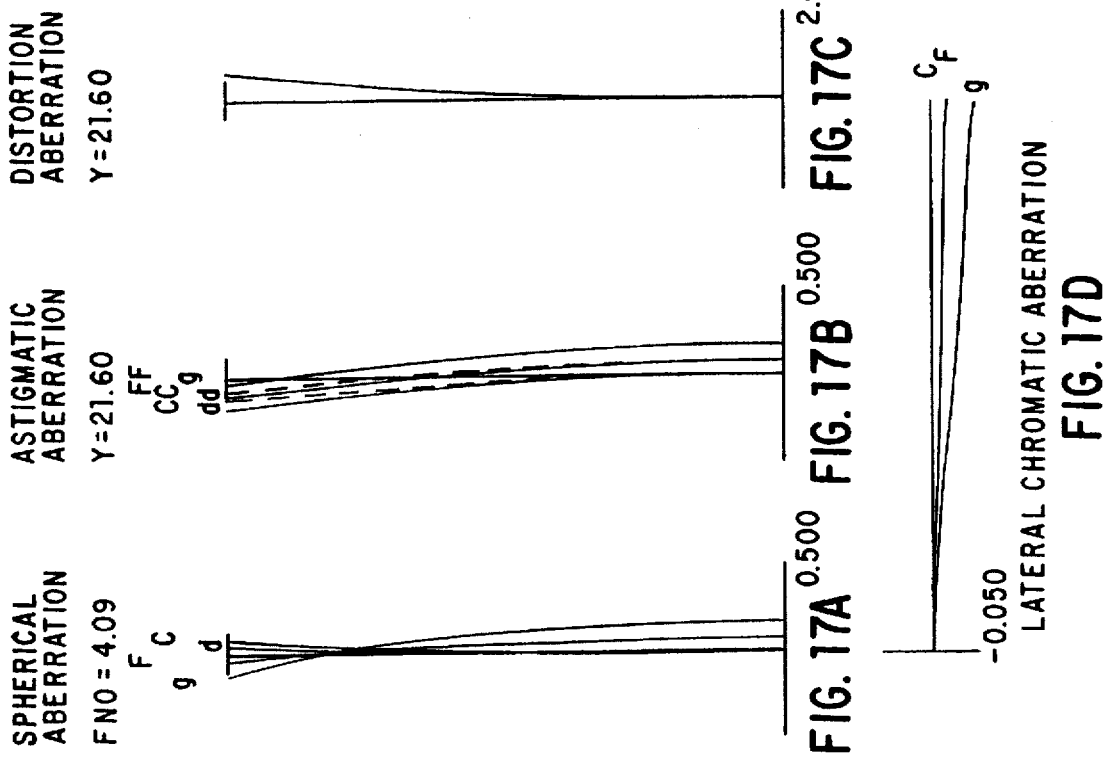

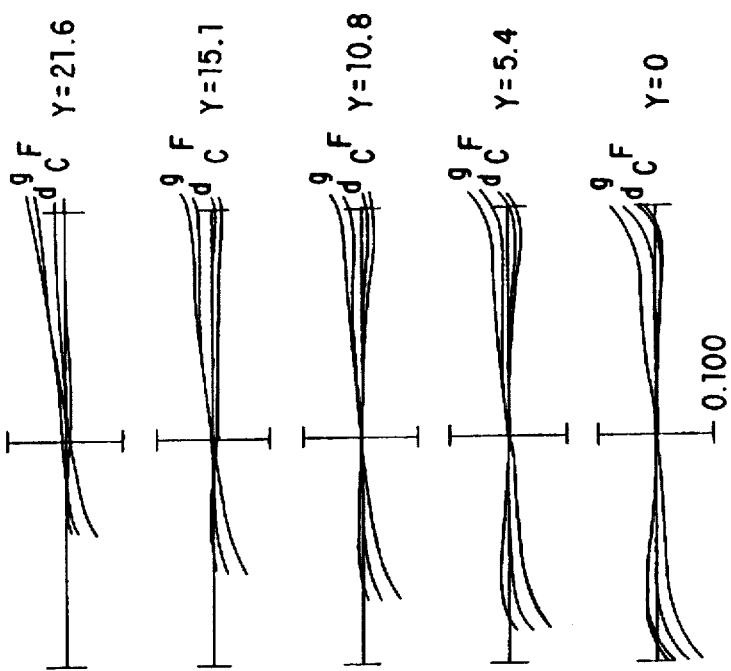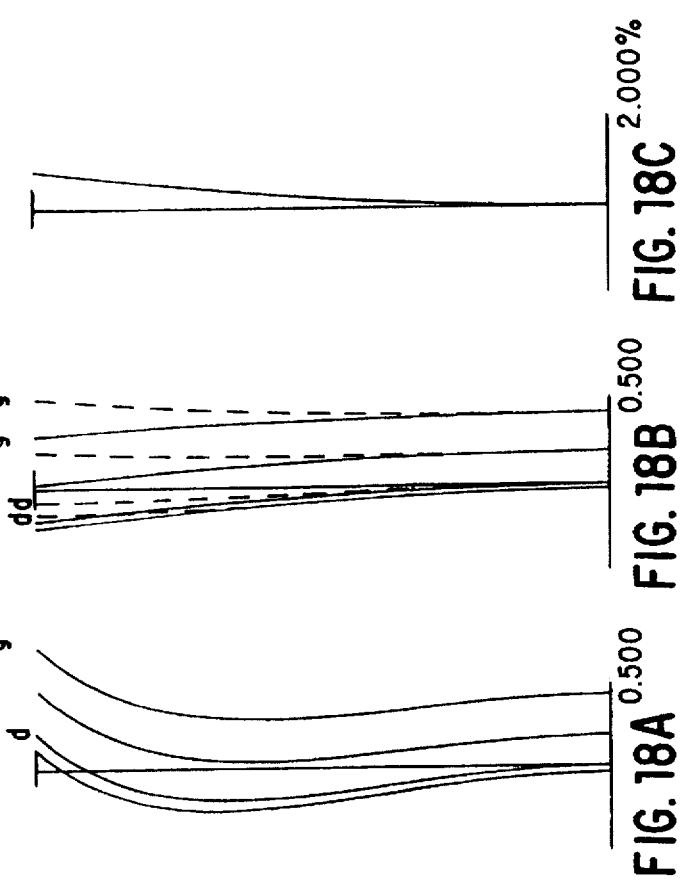

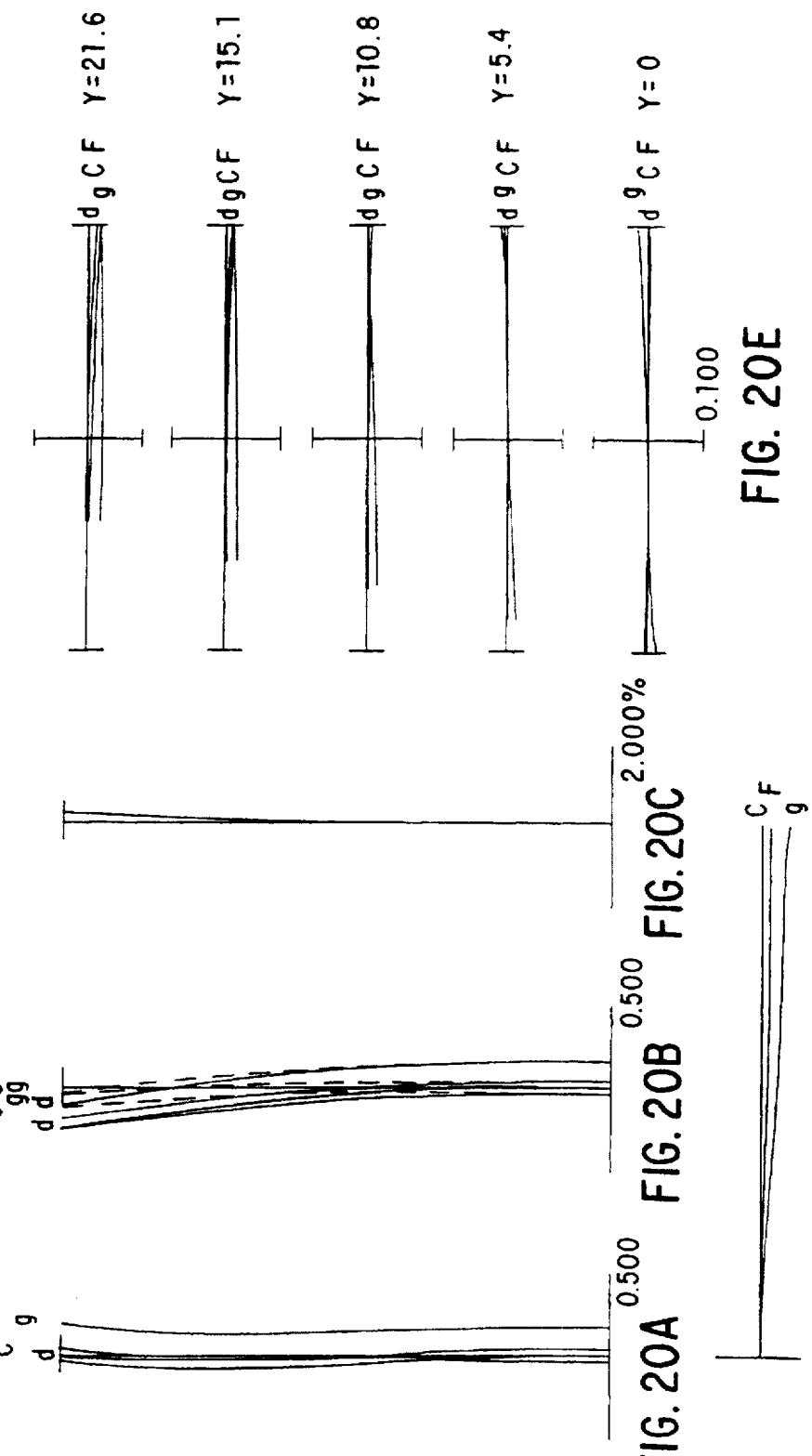

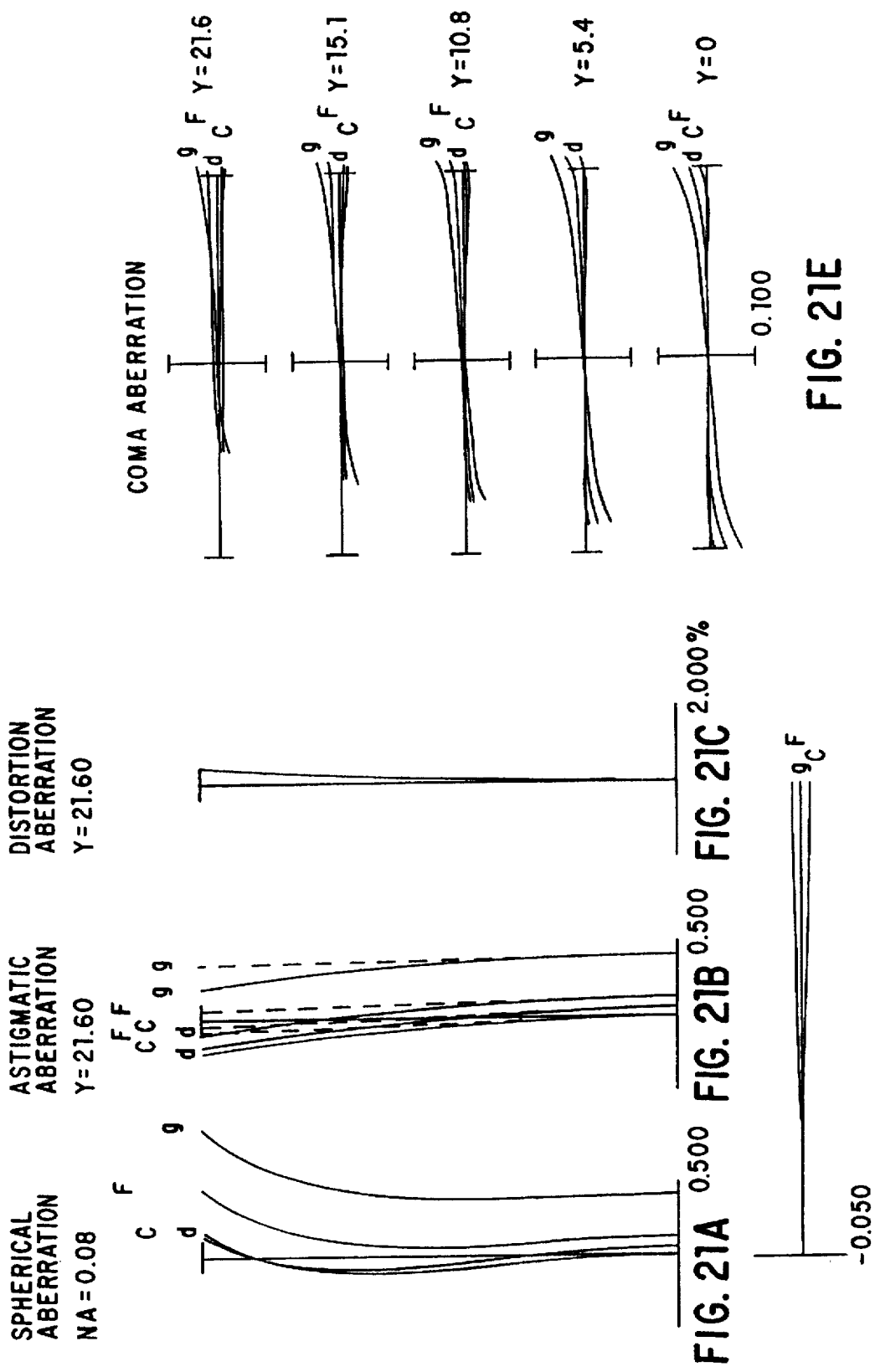

INTERNAL FOCUSING TYPE TELEPHOTO LENS

BACKGROUND OF THE INVENTION

1. Field of the Invention

The present invention relates to an internal focusing type telephoto lens, and specifically, it relates to an internal focusing type telephoto lens for single lens reflex cameras, electronic still cameras, and other similar cameras.

2. Description of Related Art

Heretofore, with known internal focusing type telephoto lenses, the effective aperture of the focusing lens group, which moves along the optical axis, is large at the time of focusing. In addition, the movement distance of the focusing lens group at the time of focusing, in other words, the focusing movement amount, is large.

With known telephoto lenses, when performing photography with increased magnification, the focusing movement amount becomes extremely large. For this reason, the mechanism for focusing must be quite large, which creates the problem of a greater burden on a motor used for an auto focus drive.

Also, it is common to attach a filter glass to the object side of the first lens group for the purpose of protecting the lens, which is made of glass material that is easily scratched. This causes an increase in weight and an increase in cost.

SUMMARY OF THE INVENTION

It is an objective of the present invention to provide an internal focusing type telephoto lens with a small effective aperture of the focusing lens group and a small focusing movement amount while maintaining superior optical performance. Furthermore, it is an objective of the invention to provide an internal focusing type telephoto lens that does not require a filter to be attached to the object side of a first lens group.

An internal focusing type lens embodying the invention includes, in the order from the object side, a first lens group G1 which has a positive refractive power, a second lens group G2 which has a negative refractive power, and a third lens group G3 which has a positive refractive power. The first lens group G1 and the second lens group G2 form a nearly afocal system. Focusing is performed by moving the second lens group G2 along the optical axis. The first lens group G1 has, at the extreme object side, a negative meniscus lens L11 with a convex surface facing towards the object side. When the focal length of the first lens group G1 is f1, the focal length of the second lens group G2 is f2, the focal length of the third lens group G3 is f3, the focal length of the entire lens group is F, the refractive index of the said negative meniscus lens L11 is Na, the radius of curvature of the surface of the object side of the said negative meniscus lens L11 is Ra, the radius of curvature of the surface of the image side of the negative meniscus lens L11 is Rb, and the Abbe number of the said negative meniscus lens L11 is σa, then, an internal focusing type telephoto lens embodying the invention satisfies the following conditions:

$$0.7<|f1\times f3/(f2\times F)|<1.3$$

$$0.05<|f2/f1|<0.55$$

$$1.65<Na$$

$$30<\sigma a<58$$

$$-1.0<(Rb-Ra)/(Rb+Ra)<-0.05$$

In a preferred embodiment of the present invention, the first lens group G1 has, in order from the object side, a front lens group G11 with a positive refractive power and a rear lens group G12 with a positive refractive power. When the focal length of the front lens group G11 of the first lens group G1 is f11, and the focal length of the rear lens group G12 of the first lens group G1 is f12, then the following condition is preferably satisfied.

$$0.2<f11/f12<2.5$$

As explained above, with an internal focusing type telephoto lens embodying the present invention, superior image formation performance can be maintained from the infinite telephoto state of focus to the maximum short-range state of focus. At the same time, the focusing movement amount as well as the effective aperture A of the focusing lens group can be kept small. Furthermore, an internal focusing type telephoto lens embodying the invention does not require the attachment of a filter to the object side of the first lens group. In addition, with an internal focusing type telephoto lens embodying the present invention, a superior image formation performance can be maintained from the infinite telephoto state of focus to the maximum short-range state of focus, even while vibration compensation by decentering of the third lens group G3 in relation to the optical axis is performed.

BRIEF DESCRIPTION OF THE DRAWINGS

Descriptions of preferred embodiments of the invention will be described in conjunction with the following drawing figures, wherein like elements are referred to with like reference numbers, and wherein:

FIG. 1 is a figure which shows the composition of an internal focusing type telephoto lens of a first embodiment of the present invention;

FIGS. 2A–2F show aberrations which occur in the infinite telephoto state of focus of the first embodiment;

FIGS. 3A–3F show aberrations which occur in the maximum short-range state of focus of the first embodiment;

FIGS. 8A–8E show aberrations which occur in the infinite telephoto state of focus of the third embodiment;

FIGS. 9A–9E show aberrations which occur in the maximum short-range state of focus of the third embodiment;

FIGS. 11A–11E show aberrations which occur in the infinite telephoto state of focus of the fourth embodiment;

FIGS. 12A–12E show aberrations which occur in the maximum short-range state of focus of the fourth embodiment;

FIGS. 17A–17E show aberrations which occur in the infinite telephoto state of focus of the sixth embodiment;

FIGS. 18A–18E show aberrations which occur in the maximum short-range state of focus of the sixth embodiment;

FIGS. 20A–20E show aberrations which occur in the infinite telephoto state of focus of the seventh embodiment; and FIGS. 21A–21E show aberrations which occur in the maximum short-range state of focus of the seventh embodiment.

DETAILED DESCRIPTION OF PREFERRED EMBODIMENTS

Figure 4:
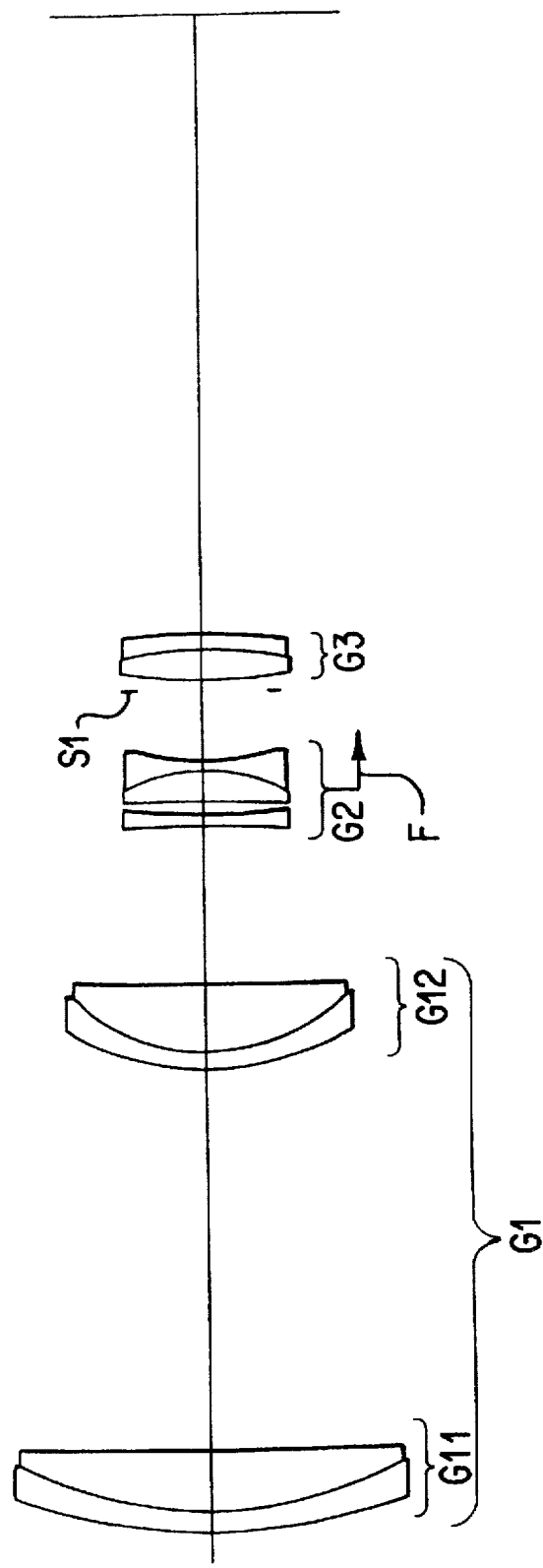
FIG. 4 is a figure which shows the composition of an internal focusing type telephoto lens of a second embodiment of the present invention.
Figure 5:
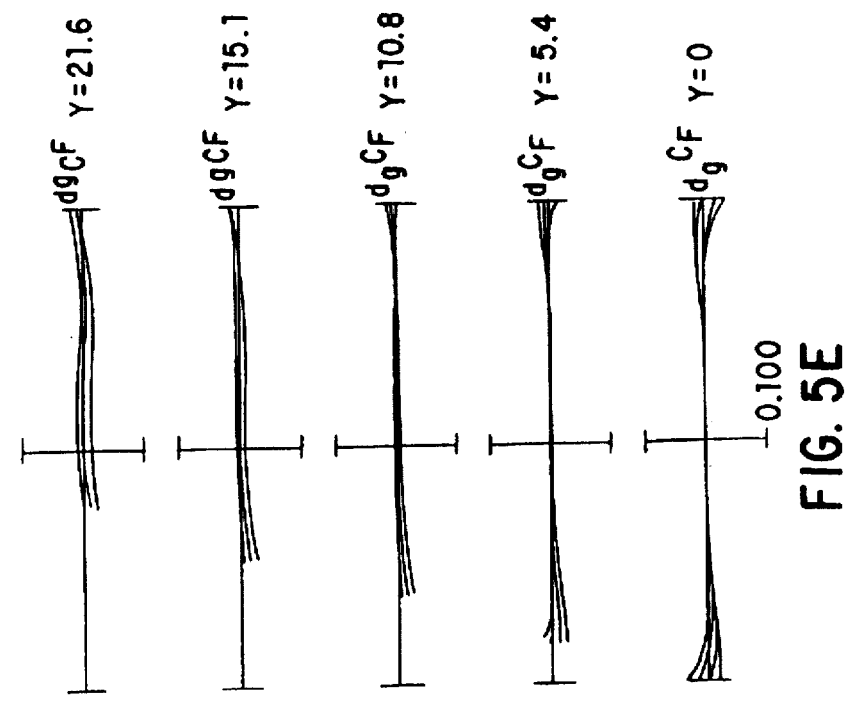
FIGS. 5A–5E show aberrations which occur in the infinite telephoto state of focus of the second embodiment.
Figure 6:
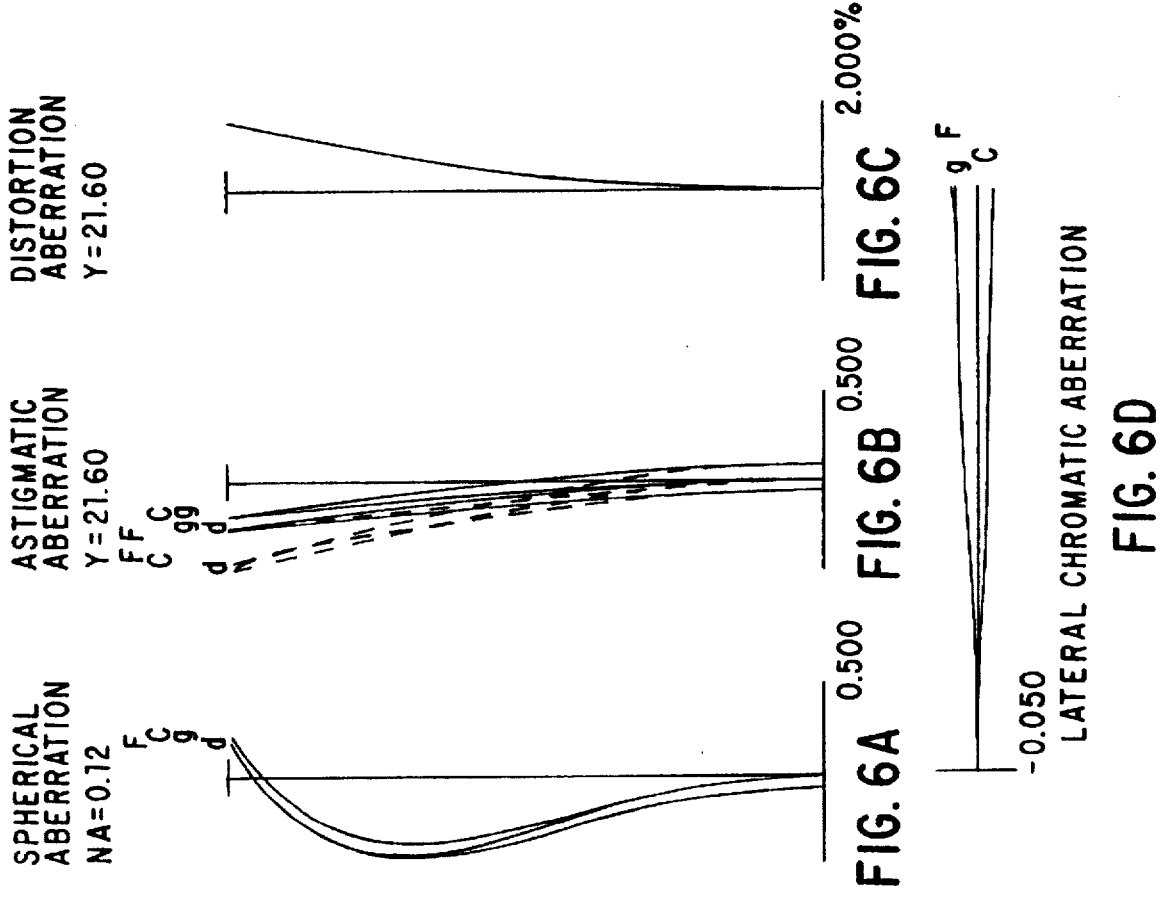
FIGS. 6A–6E show aberrations which occur in the maximum short-range state of focus of the second embodiment.

A telephoto lens embodying the present invention may include three lens groups G1, G2 and G3, which have positive, negative, and positive refractive powers, respectively. The lens may perform focusing by movement, in the direction of the optical axis, of the second lens group G2 which has a negative refractive power. With this type of focusing method, the second lens group G2 is moved along the optical axis so that the focal point of the object side of the second lens group G2 is always in the vicinity of the image of the photographic subject formed by the first lens group G1. Accordingly, the light which enters the third lens group G3 is always nearly parallel to the optical axis, and the image formed by the entire optical system is always in a fixed position.

In order to reduce the movement amount (focusing movement amount) of the second lens group G2, which is the focusing lens group, it is best to reduce the movement amount of the image that is produced by the first lens group G1 in relation to the movement amount of the object.

When the focal length of the first lens group G1 is f1, and the first lens group G1 is a thin lens, and when the object length is a, and the image length is b, then the relationship in formula (A) is satisfied.

$$1/a + 1/b = 1/f1 \qquad (A)$$

By transforming formula (A), the relationship shown in the following formula (B) is achieved.

$$f1 = a/(a/b+1) \qquad (B)$$

Next, the longitudinal magnification a is shown by the following formula (C).

$$\alpha = (-b/a)^2 = b^2/a^2 \qquad (C)$$

By transforming formula (C), the relationship shown in the following formula (D) is achieved.

$$b = a\, \alpha^{1/2} > 0 \qquad (D)$$

At the time of focusing, when the object moves from a particular location, the object length a changes. However, when focusing on a constant object length a, in other words, when the object length a equals a constant, it is best if the longitudinal magnification is reduced in order to reduce the focusing movement amount of the second lens group G2. In other words, it is best to reduce the movement amount of the image formed by the first lens group G1 relative to the movement amount of the object.

Here, the formula (D) is substituted into formula (B), and the relationship shown by the following formula (E) is achieved.

$$f1 = a/(1/\alpha^{1/2} + 1) \qquad (E)$$

In this way, through formula (E), it is understood that when the longitudinal magnification is reduced, the focal length f1 is also reduced. Accordingly, if the focal length f1 of the first lens group G1 is reduced, then the focusing movement amount can be reduced.

In addition, when the focal length of the second lens group G2 is f2, by considering the second lens group G2 to be a thin lens, the focal length f3 of the third lens group G3 is constant due to the formation of a nearly afocal system comprising the first lens group G1 and the second lens group G2. The relationship is shown by the following formula.

$$f1/f2 = \text{constant} \qquad (F)$$

Accordingly, through the formula (F), when the focal length f1 of the first lens group G1 is reduced, the focal length f2 of the second lens group G2 is inevitably reduced. When the composite refractive power of the first lens group G1 and the second lens group G2 is large, although this contributes to shortening of the entire length of the lens, the aberration of the entire optical system is made worse.

In a lens system embodying the present invention, based upon the above considerations, the effective aperture of the second lens group G2, is reduced along with the focusing movement amount, and the lens also provides conditions whereby favorable optical performance (aberration properties) can be obtained.

Hereafter, each of the conditional expressions of the present invention will be explained.

With a telephoto lens of the present invention, the first lens group G1 has, at the extreme object side, a negative meniscus lens L11 having a convex surface facing towards the object side. The telephoto lens satisfies the following expressions.

$$0.7 < |f1 \times f3/(f2 \times F)| < 1.3 \qquad (1)$$

$$0.05 < |f2|/f1 < 0.55 \qquad (2)$$

$$1.65 < Na \qquad (3)$$

$$30 < \sigma a < 58 \qquad (4)$$

$$-1.0 < (Rb - Ra)/(Rb + Ra) < -0.05 \qquad (5)$$

In the above five formulas:

f1 is the focal length of the first lens group G1;
f2 is the focal length of the second lens group G2;
f3 is the focal length of the third lens group G3;
F is the focal length of the entire lens system;
Na is the refractive index of the negative meniscus lens L11;
Ra is the radius of curvature of the surface of the object side of the negative meniscus lens L11;
Rb is the radius of curvature of the surface of the image side of the negative meniscus lens L11; and
σa is the Abbe number of the negative meniscus lens L11.

The conditional expression (1) regulates the appropriate range for the level of afocalness of the nearly afocal system formed of the first lens group G1 and the second lens group G2. When departing from the range that is regulated by the ceiling value and the floor value of the conditional expression (1), the composite refractive power of the first lens group G1 and the second lens group G2 becomes stronger, and this is not desired because the spherical aberration fluctuation which occurs due the short range focusing increases.

The conditional expression (2) regulates the appropriate range for the refractive powers of the first lens group G1 and the second lens group G2.

When exceeding the ceiling value of the conditional expression (2), the effective aperture of the second lens group G2 increases, and this is not desired because it is not in accordance with the objective of the present invention.

Conversely, when falling below the floor value of the conditional expression (2), the spherical aberration fluctuation which occurs due to short range focusing increases, and this is not desired. Furthermore, the lower coma aberration in regards to the g line (l=435.6 nm) becomes excessive, and this is not desired.

Moreover, it is most desirable when the floor value of the conditional expression (2) is 0.1 and the ceiling value is 0.45.

The conditional expressions (3), (4) and (5) are conditions which relate to the negative meniscus lens L11, which is arranged at the extreme object side of the first lens group G1.

When falling below the floor value of the conditional expression (3), the curvature of the spherical aberration increases, and this is not desired. Moreover, it is most desirable when the floor value of the conditional expression (3) is 1.7.

When falling below the floor value of the conditional expression (4), the secondary color aberration increases, and this is not desirable. Conversely, when exceeding the ceiling value of the conditional expression (4), the floor value of conditional expression (3) is exceeded with current glass materials, and this is not desirable. Moreover, it is most desirable when the floor value of the conditional expression (4) is 32 and the ceiling value is 53.

When falling below the floor value of the conditional expression (5), the lens L11 ceases to be a negative meniscus lens. On the other hand, when exceeding the ceiling value of the conditional expression (5), the negative refractive power of the negative meniscus lens L11 is too weak, and the spherical aberration is very difficult to correct. Moreover, it is most desirable when the floor value of the conditional expression (5) is −0.8 and the ceiling value is −0.3.

In addition, with the present invention, in order to decrease the focusing movement amount while obtaining a more favorable image formation performance, it is best that the first lens group G1 have, in order from the object side, a front lens group G11 with a positive refractive power and a rear group G12 with a positive refractive power, and that the following conditional expression (6) is satisfied.

$$0.2 < f11/f12 < 2.5 \quad (6)$$

In the expression (6):
f11 is the focal length of the front lens group G11 of the first lens group G1; and
f12 is the focal length of the rear group G12 of the first lens group G1.

The conditional expression (6) is the condition which provides a balance between shortening of the entire length of the optical system, and favorable image formation performance. The expression (6) regulates the appropriate range for the comparison of the refractive power of the front lens group G11 and the refractive power of the rear lens group G12 of the first lens group G1.

When exceeding the ceiling value of the conditional expression (6), the entire length of the optical system becomes too big, and this is not desirable. Conversely, when falling below the floor value of the conditional expression (6), the spherical aberration fluctuation which occurs due to short range focusing increases, and that is not desirable. In addition, the lower coma aberration of the g line becomes excessive, and this is not desirable.

Moreover, it is preferable that the floor value of the conditional expression (6) is 0.3 and that the ceiling value is 2.0. Under these conditions, the balance between the entire length of the optical system and a favorable image formation performance is optimized.

Furthermore, with the present invention, in order to decrease the focusing movement amount together with obtaining a more favorable image formation performance, it is desirable to satisfy the following conditional expression (7).

$$0.35 < f1/F < 0.80 \quad (7)$$

The conditional expression (7) regulates the appropriate range for the comparison of the focal length f1 of the first lens group G1 and the focal length F of the entire lens system.

When exceeding the ceiling value of the conditional expression (7), the focal length f1 of the first lens group G1 increases, and the focusing movement amount also increases with the increasing of the entire length of the optical system, and this is not desirable. Conversely, when falling below the floor value of the conditional expression (7), the focal length f1 of the first lens group G1 decreases. As a result, the spherical aberration cannot be sufficiently corrected, even if the aperture ratio of the first lens group G1 is decreased while maintaining the composition of a minimal number of lenses. Under these conditions, it becomes difficult to make it a high-speed optical system. At the same time, it becomes necessary to increase the thickness of the positive lens composition, thus increasing the weight of the optical system, and this is not desirable.

Moreover, it is most desirable when the floor value of the conditional expression (7) is 0.4 and the ceiling is 0.7.

Furthermore, when the refractive power of the first lens group G1 is too strong, the spherical aberration of the first lens group G1 itself becomes too big, in the negative direction, and the aberrations of the entire photographic optical system are made worse. Accordingly, in order to obtain a favorable spherical aberration together with reducing the focusing movement amount, it is desirable to satisfy the following conditional expression (8).

$$0.2 < \phi/f1 < 0.7 \qquad (8)$$

In the expression (8), $\phi$ is the effective aperture of the lens surface of the object side of the front lens group G11 of the first lens group G1.

The conditional expression (8) regulates the comparison of the effective aperture ratio of the lens surface of the object side of the front lens group G11 of the first lens group G1, against the focal length f1 of the first lens group G1.

When exceeding the ceiling value of the conditional expression (8), the focal length f1 of the first lens group G1 decreases relative to the effective aperture, and aberration correction becomes difficult because the spherical aberration of the first lens group G1 becomes too large in the negative direction. In addition, the spherical aberration of the secondary color also increases. In order to correct these aberrations, the composition of the first lens group G1 with a minimal number of lenses, as with the present invention, becomes very difficult.

Conversely, when falling below the floor value of the conditional expression (8), the focal length of the first lens group G1 increases, and the focusing movement amount increases. As a result, the entire length of the lens increases, and it violates the objective of the present invention, as described above.

Moreover, it is most desirable when the floor value of the conditional expression (8) is 0.23 and the ceiling value is 0.40.

In addition, in order for the strong refractive power of the first lens group G1 to be distributed, it is arranged with a rear lens group G12 which has a positive lens composition at the image side of the front lens group G11. The position of the rear lens group G12 in relation to the front lens group G11, is arranged a certain distance from the front lens group G11 so as to make the lens system of the rear lens group G12 as small as possible. However, this is determined by the aperture ratio which is carried by the first lens group G1. In this way, the aberrations which are generated by the first lens group G1, especially the spherical aberrations, can occur in the two positive lens groups of the first lens group G1. Furthermore, each lens group has strong refractive power, and they can suppress the curvature of the spherical aberration which is generated at the time when the correction of such spherical aberration is performed.

Accordingly, in regards to the curvature of the spherical aberration, it is desirable that the composite refractive power of the rear lens group G12 of the first lens group G1, the second lens group G2, and the third lens group G3, be positive.

Furthermore, to obtain more favorable aberration properties and especially from the perspective of correcting chromatic aberration, it is desirable that the front lens group G11 be, in order from the object side, a negative meniscus lens having a convex surface that faces towards the object side cemented to a positive lens. In addition, it is desirable that the rear lens group G12 be, in order from the object side, a negative meniscus lens having a convex surface that faces towards the object side cemented to a positive meniscus lens having a convex surface faces towards the object side. In this way, correction of the chromatic aberration of the magnification, as well as the color aberration on the axis, can be performed at the same time that the spherical aberration which occurs in the first lens group G1 is corrected.

Furthermore, with a telephoto lens of the present invention, it is possible to displace the image formation position by decentering the third lens group G3 relative to the optical axis. In particular, the lens may be equipped with a blur detection device which detects shaking of the optical system that is caused by hand or other vibrations. The lens may further be equipped with a drive device which drives decentering of the third lens group G3 in relation to the optical axis to perform vibration compensation. Such a system would include a calculation device which processes an output signal from the blur detection device and converts it to a signal used to drive the decentering of the third lens group G3 in relation to the optical axis.

An explanation of preferred embodiments of the present invention will be explained hereafter based on FIGS. 1–21. In each embodiment, the internal focusing type telephoto lens of the present invention includes, in order from the object side, a first lens group G1 which has a positive refractive power, a second lens group G2 which has a negative refractive power, and a third lens group G3 which has a positive refractive power. In addition, a nearly afocal system is formed by the first lens group G1 and the second lens group G2. The second lens group G2 moves along the optical axis to focus the lens on an infinite distance telephoto object or a short-range telephoto object.

Furthermore, in some embodiments, the first lens group G1 includes, in order from the object side, a front lens group G11, which is made from a positive lens cemented to a negative meniscus lens having a convex surface that faces towards the object side, and a rear lens group G12, which is made from a positive lens cemented to a negative meniscus lens having a convex surface that faces towards the object side.

The First Embodiment

FIG. 1 is a figure which shows the composition of a first internal focusing type telephoto lens embodying the invention. The internal focusing type telephoto lens of FIG. 1 comprises, in the order from the object side, a front lens group G11 of a first lens group G1, which is made from a positive meniscus lens having a convex surface that faces towards the object side cemented to a negative meniscus lens having a convex surface that faces towards the object side; and a rear lens group G12 of the first lens group G1, which is made from a positive meniscus lens having a convex surface that faces towards the object side cemented to a negative meniscus lens having a convex surface that faces towards the object side. The telephoto lens further comprises a second lens group G2 which is made from a first positive double concave lens cemented to a double convex lens which is cemented to a second double concave lens. The telephoto lens also includes a third lens group G3, which is made from a double convex lens, a negative meniscus lens having a convex surface that faces towards the image side, and a positive meniscus lens having a concave surface that faces towards the object side. The telephoto lens further comprises an aperture stop S1 and a field stop S2.

FIG. 1 shows the position of each lens group as they occur in the infinite telephoto state of focus. To focus the lens on a short-range object, the second lens group G2 is moved toward the image side, as indicated by arrow F.

In addition, by moving the third lens group G3 appropriately in a direction substantially orthogonal to the optical axis, as shown by arrow B, fluctuations of the image position which are caused by vibrations can be corrected.

In a blur correction device suitable for use with this embodiment, shaking of the optical system caused by vibrations is detected by a blur detection device 1. A calculation device 2 processes a signal output from the blur detection device 1, and converts it to a drive signal used to drive decentering of the third lens group G3 relative to the optical axis. The drive device 3 drives the decentering of the third lens group G3 relative to the optical axis based upon a signal from the calculation device 2.

In Table 1 below, values of certain parameters of the first embodiment of the present invention are given. In Table 1, F indicates the focal length of the entire lens system; F No indicates the F number; β indicates the photographic magnification; Bf indicates the back-focus; and DO indicates the distance from the object to the first lens surface (object distance). In addition, the numbers at the left end indicate the order of each lens surface from the object side; r indicates the radius of curvature of each lens surface; d indicates the spacing for each lens surface; and n and σ indicate the refractive index against the d line (l=587.6 nm), as well as the Abbe number.

TABLE 1

F = 294.0
F NO = 4.08

| | r | d | υ | n |
|---|---|---|---|---|
| 1 | 102.6704 | 4.0000 | 40.90 | 1.796310 |
| 2 | 77.3892 | 11.0000 | 82.52 | 1.497820 |
| 3 | 865.8373 | 65.6000 | | |
| 4 | 54.8552 | 2.9000 | 40.90 | 1.796310 |
| 5 | 37.7430 | 12.7000 | 82.52 | 1.497820 |
| 6 | 759.9060 | d6 = variable | | |
| 7 | −126.4606 | 2.0000 | 45.37 | 1.796681 |
| 8 | 85.4096 | 2.0000 | | |
| 9 | 6541.5971 | 6.0000 | 33.89 | 1.803840 |
| 10 | −31.9679 | 2.0000 | 60.03 | 1.640000 |
| 11 | 63.7048 | d11 = variable | | |
| 12 | ∞ | 1.5000 | | |
| 13 | 333.3759 | 4.5000 | 70.41 | 1.487490 |
| 14 | −103.0580 | 3.0000 | | |
| 15 | −33.1342 | 3.0000 | 28.56 | 1.795040 |
| 16 | −45.9060 | 2.9000 | | |
| 17 | −171.2558 | 5.0000 | 70.41 | 1.487490 |
| 18 | −42.4103 | 3.0000 | | |
| 19 | ∞ | Bf | | |

(Variable spacing which occurs at the time of focusing)

| | Infinite | Short-range |
|---|---|---|
| F, β | 294.00000 | −0.13698 |
| DO | 0.00000 | 2216.9133 |
| d6 | 29.37081 | 36.64968 |
| d11 | 12.24393 | 4.96507 |
| Bf | 110.37196 | 110.37196 |

(Values Corresponding to the Conditions)

| | |
|---|---|
| (1) | |f1 · f3/(f2 · F)| = 1.0 |
| (2) | |f2|/f1 = 0.38 |
| (3) | Na = 1.80 |
| (4) | υa = 40.9 |
| (5) | (Rb − Ra)/(Rb + Ra) = −0.14 |
| (6) | f11/f12 = 1.81 |
| (7) | f1/F = 0.425 |
| (8) | Φ/f1 = 0.246 |

(Vibration Compensation data)

| | Infinite telephoto state | Maximum short-range state |
|---|---|---|
| Displacement amount of the third lens group G3 | 1.0 mm (maximum) | 1.0 mm (maximum) |
| Movement amount of corresponding image | +1.0 mm (maximum) | +1.0 mm (maximum) |

The positive sign of the image movement amount indicates that the movement of the image is in the same direction as the displacement direction of the third lens group G3, which is the anti-vibration lens group.

Furthermore, in the present embodiment, the effective aperture F2 of the second lens group G2 is 29.7, and it can be understood that the effective aperture F2 of the focusing lens group is small.

In addition, when the distance from the object to the image plane is R, and the movement amount of the second lens group G2 at the time of focusing from an infinite telephoto state (R=∞) to the maximum short-range state (R=2500), is 7.28, it can be understood that the focusing movement amount is small.

In addition, in the present embodiment, the composite refractive power of the first lens group G1, the second lens group G2 and the third lens group G3 is positive.

FIGS. 2A–2F and 3A–3F show aberrations which occur in the infinite telephoto state of focus and the maximum short-range state of focus, respectively. In these figures, F NO identifies the F number, Y identifies the image height, NA identifies the numerical apertures, d identifies the d line (l=587.6 nm), and C identifies the C line (l=656.3 nm).

In the aberrational figures that show the astigmatic aberrations, the solid lines show the sagittal image plane and the broken lines show the meridional image plane. In the aberrational figures that show the lateral chromatic aberration, the d line is used as a standard.

The aberrational figures that show the coma aberration with vibration compensation show the aberrations when the displacement amount of the third lens group G3 is 1 mm (maximum).

As can be seen from each of the aberrational figures, in the present embodiment, all aberrations are favorably corrected, even when vibration compensation is performed, from the infinite telephoto state of focus to the maximum short-range state of focus. Also, the displacement amount of the vibration compensation lens group G3 may also be above 1 mm or below 1 mm.

Embodiment 2

FIG. 4 shows the composition of a second internal focusing type telephoto lens embodying the invention.

The internal focusing type telephoto lens of FIG. 4 includes, in order from the object side, a front lens group G11 of a first lens group G1, which is made from a positive meniscus lens having a convex surface that faces towards the object side cemented to a negative meniscus lens having a convex surface that faces towards the object side; and a rear lens group G12 of the first lens group G1, which is made from a positive meniscus lens having a convex surface that faces towards the object side cemented to a negative meniscus lens having a convex surface that faces towards the object side. The telephoto lens also includes a second lens group G2, which is made from a first negative double concave lens, a positive meniscus lens, having a convex surface that faces towards the image side and a second double concave lens. The telephoto lens includes a third lens group G3, which is made from a positive double convex lens cemented to a negative meniscus lens having a convex surface that faces towards the image side. The telephoto lens further includes an aperture stop S1.

FIG. 4 shows the position of each lens group as they occur in the infinite telephoto state of focus. To focus on a short-range object, the second lens group G2 is moved toward the image side, as shown by arrow F.

In Table 2, values are given for certain parameters of the second embodiment of the present invention. In Table 2, F indicates the focal length of the entire lens system; F NO indicates the F number; β indicates the photographic magnification; Bf indicates the back-focus; and DO indicates the distance from the object to the first lens surface (object distance). In addition, the numbers at the left end indicate the order of each lens surface from the object side; r indicates the radius of curvature of each lens surface; d indicates the spacing for each lens surface; and n and σ indicate the refractive index against the d line (l=587.6 nm), as well as the Abbe number.

TABLE 2

F = 294.0
F NO = 4.08

| | r | d | υ | n |
|---|---|---|---|---|
| 1 | 101.7809 | 4.0000 | 40.90 | 1.796310 |
| 2 | 76.9969 | 11.0000 | 82.52 | 1.497820 |
| 3 | 648.8858 | 65.6000 | | |
| 4 | 52.3582 | 2.9000 | 40.90 | 1.796310 |
| 5 | 36.4283 | 12.7000 | 82.52 | 1.497820 |
| 6 | 490.6807 | d6 = variable | | |
| 7 | −169.6578 | 2.0000 | 45.37 | 1.796681 |
| 8 | 159.2144 | 2.0000 | | |
| 9 | −369.6737 | 6.0000 | 33.89 | 1.803840 |
| 10 | −34.8865 | 2.0000 | 60.03 | 1.640000 |
| 11 | 48.7079 | d11 = variable | | |
| 12 | ∞ | 1.5000 | | |
| 13 | 91.5020 | 5.5000 | 70.41 | 1.487490 |
| 14 | −66.3533 | 3.0000 | 28.56 | 1.795040 |
| 15 | −95.3198 | Bf | | |

(Variable spacing which occurs at the time of focusing)

| | Infinite | Short-range |
|---|---|---|
| F, β | 294.00000 | −0.13601 |
| DO | 0.00000 | 2230.9761 |
| d6 | 28.67945 | 35.90653 |
| d11 | 11.92087 | 4.69379 |
| Bf | 109.3912 | 109.3912 |

(Values Corresponding to the Conditions)

| | |
|---|---|
| (1) | lf1 · f3/(f2 · F)l = 1.0 |
| (2) | lf2l/f1 = 0.38 |
| (3) | Na = 1.80 |
| (4) | υa = 40.9 |
| (5) | (Rb − Ra)/(Rb + Ra) = −0.14 |
| (6) | f11/f12 = 1.92 |
| (7) | f1/F = 0.425 |
| (8) | Φ/f1 = 0.246 |

Furthermore, with the present embodiment, the effective aperture F2 of the second lens group G2 is 30.5, and it can be understood that the effective aperture F2 of the focusing lens group is small.

In addition, when the distance from the object to the image plane is R, and the movement amount of the second lens group G2 at the time of focusing from an infinite telephoto state (R=∞) to the maximum short-range state (R=2500), is 7.21, it can be understood that the focusing movement amount is small.

FIGS. 5A–5E and 6A–6E show aberrations which occur in the infinite telephoto state of focus and the maximum short-range state of focus, respectively. In each aberrational figure, F NO identifies the F number, Y identifies the image height, NA identifies the numerical apertures, d identifies the d line (l=587.6 nm), C identifies the C line (l=656.3 nm), F identifies the F line (l=486.1 nm), and g identifies the g line (l=435.6 nm).

In the aberrational figures that show the astigmatic aberrations, the solid lines show the sagittal image plane and the broken lines show the meridional image plane. In the aberrational figures that show the lateral chromatic aberration, the d line is used as a standard.

As can be seen from each of the aberrational figures, in the second embodiment, all aberrations occurring from the infinite telephoto state of focus to the maximum short-range state of focus are favorably corrected.

Embodiment 3

Figure 7:
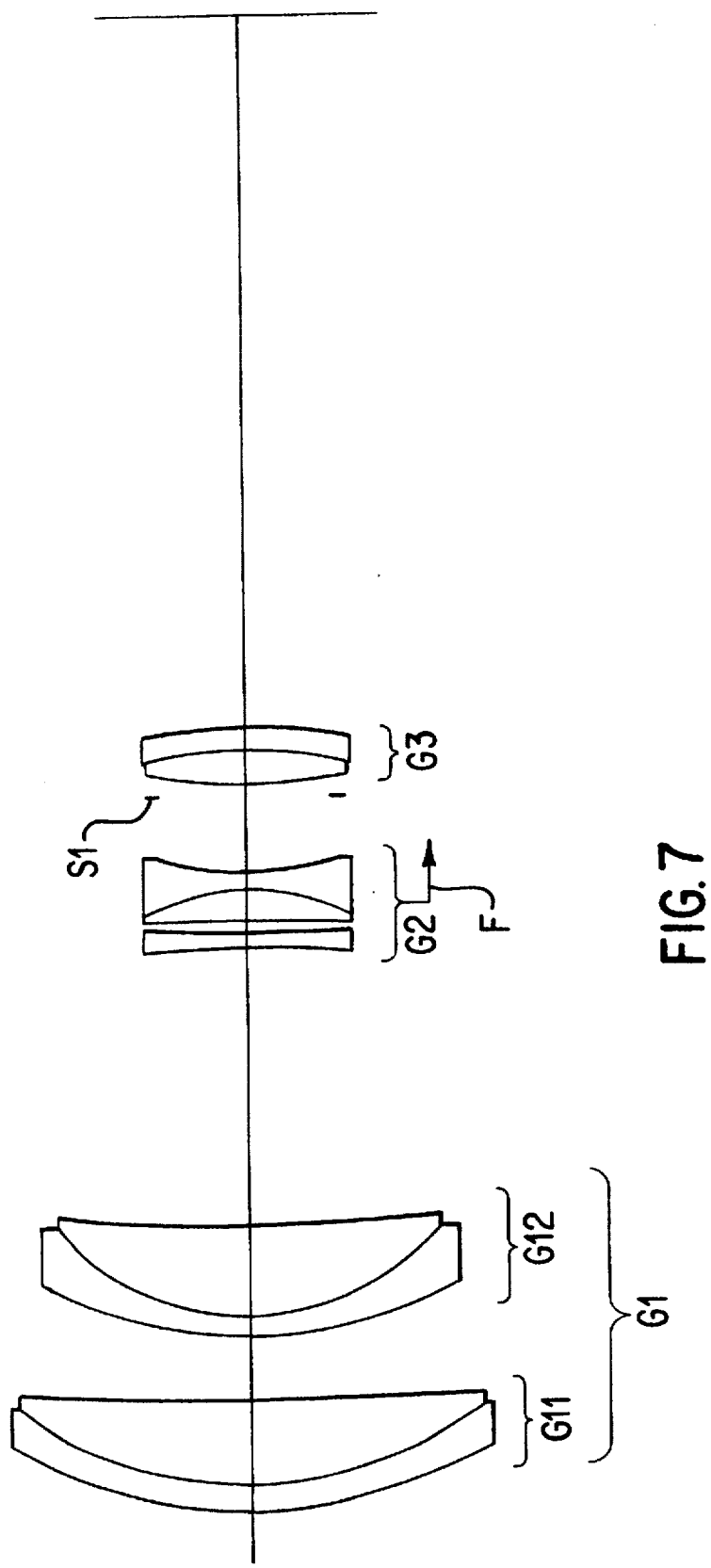
FIG. 7 is a figure which shows the composition of an internal focusing type telephoto lens of a third embodiment of the present invention.

FIG. 7 shows the composition of a third internal focusing type telephoto lens embodying the invention.

The internal focusing type telephoto lens of FIG. 7 includes, in order from the object side, a front lens group G11, of a first lens group G1, which is made from a positive meniscus lens having a convex surface that faces towards the object side cemented to a negative meniscus lens having a convex surface that faces towards the object side; and a rear lens group G12 of the first lens group G1, which is made from a positive meniscus lens having a convex surface that faces towards the object side cemented to a negative meniscus lens having a convex surface that faces towards the object side. The telephoto lens further includes a second lens group G2, which is made from a negative double concave lens, a first positive meniscus lens having a convex surface that faces towards the image side and a second double concave lens. The telephoto lens also includes a third lens group G3, which is made from a positive double convex lens cemented to a negative meniscus lens having a convex surface that faces towards the image side. The telephoto lens also includes an aperture stop S1.

FIG. 7 shows the position of each lens group as they occur in the infinite telephoto state of focus. To focus the telephoto lens on a short-range object, the second lens group G2 is moved towards the image side, as indicated by arrow F.

Table 3 shows values for certain parameters of the third embodiment. In Table 3, F indicates the focal length of the entire lens system; F NO indicates the F number; β indicates the photographic magnification; Bf indicates the back-focus; and DO indicates the distance from the object to the first lens surface (object distance). In addition, the numbers at the left end indicate the order of each lens surface from the object side; r indicates the radius of curvature of each lens surface; d indicates the spacing for each lens surface; and n and σ indicate the refractive index against the d line (l=587.6 nm), as well as the Abbe number.

TABLE 3

F = 294.0
F NO = 4.08

| | r | d | υ | n |
|---|---|---|---|---|
| 1 | 73.5675 | 4.0000 | 33.89 | 1.803840 |
| 2 | 59.0723 | 13.0000 | 82.52 | 1.497820 |
| 3 | 508.0487 | 10.0000 | | |
| 4 | 64.4312 | 2.9000 | 52.30 | 1.748099 |
| 5 | 38.5074 | 14.0000 | 82.52 | 1.497820 |
| 6 | 236.3015 | d6 = variable | | |
| 7 | −152.5242 | 2.0000 | 45.37 | 1.796681 |
| 8 | 283.7047 | 2.0000 | | |
| 9 | −249.8765 | 5.0000 | 33.89 | 1.803840 |
| 10 | −33.0617 | 2.0000 | 60.03 | 1.640000 |
| 11 | 45.4503 | d11 = variable | | |
| 12 | ∞ | 1.5000 | | |
| 13 | 87.2972 | 5.5000 | 70.41 | 1.487490 |
| 14 | −60.9313 | 3.0000 | 28.56 | 1.795040 |
| 15 | −93.6122 | Bf | | |

TABLE 3-continued

| (Variable spacing which occurs at the time of focusing) | | |
|---|---|---|
| | Infinite | Short-range |
| F, β | 294.04934 | −0.13601 |
| D0 | 0.00000 | 2230.9761 |
| d6 | 43.54196 | 50.76904 |
| d11 | 12.57349 | 5.34641 |
| Bf | 109.5735 | 109.5735 |

| (Values Corresponding to the Conditions) | |
|---|---|
| (1) | |f1 · f3/(f2 · F)| = 1.0 |
| (2) | |f2|/f1 = 0.38 |
| (3) | Na = 1.80 |
| (4) | υa = 33.9 |
| (5) | (Rb − Ra)/(Rb + Ra) = −0.11 |
| (6) | f11/f12 = 0.66 |
| (7) | f1/F = 0.425 |
| (8) | Φ/f1 = 0.246 |

In the third embodiment, the effective aperture F2 of the second lens group G2 is 30.6, and it can be understood that the effective aperture F2 of the focusing lens group is small.

In addition, when the distance from the object to the image plane is R, and the movement amount of the second lens group G2 at the time of focusing from an infinite telephoto state (R=∞) to the maximum short-range state (R=2500), is 6.19, it can be understood that the focusing movement amount is small.

FIGS. 8A–8E and 9A–9E show the aberrations which occur in the infinite telephoto state of focus and the maximum short-range state of focus, respectively. In the aberrational figures, F NO identifies the F number, Y identifies the image height, NA identifies the numerical apertures, d identifies the d line (l=587.6 nm), C identifies the C line (l=656.3 nm), F identifies the F line (l=486.1 nm), and g identifies the g line (l=435.6 nm).

Moreover, in the aberrational figures that show the astigmatic aberration, the solid lines show the sagittal image plane and the broken lines show the meridional image plane. In the aberrational figures that show the lateral chromatic aberration, the d line is used as a standard.

As can be seen from each of the aberrational figures, in the third embodiment, all aberrations occurring from the infinite telephoto state of focus to the maximum short-range state of focus are favorably corrected.

Embodiment 4

Figure 10:
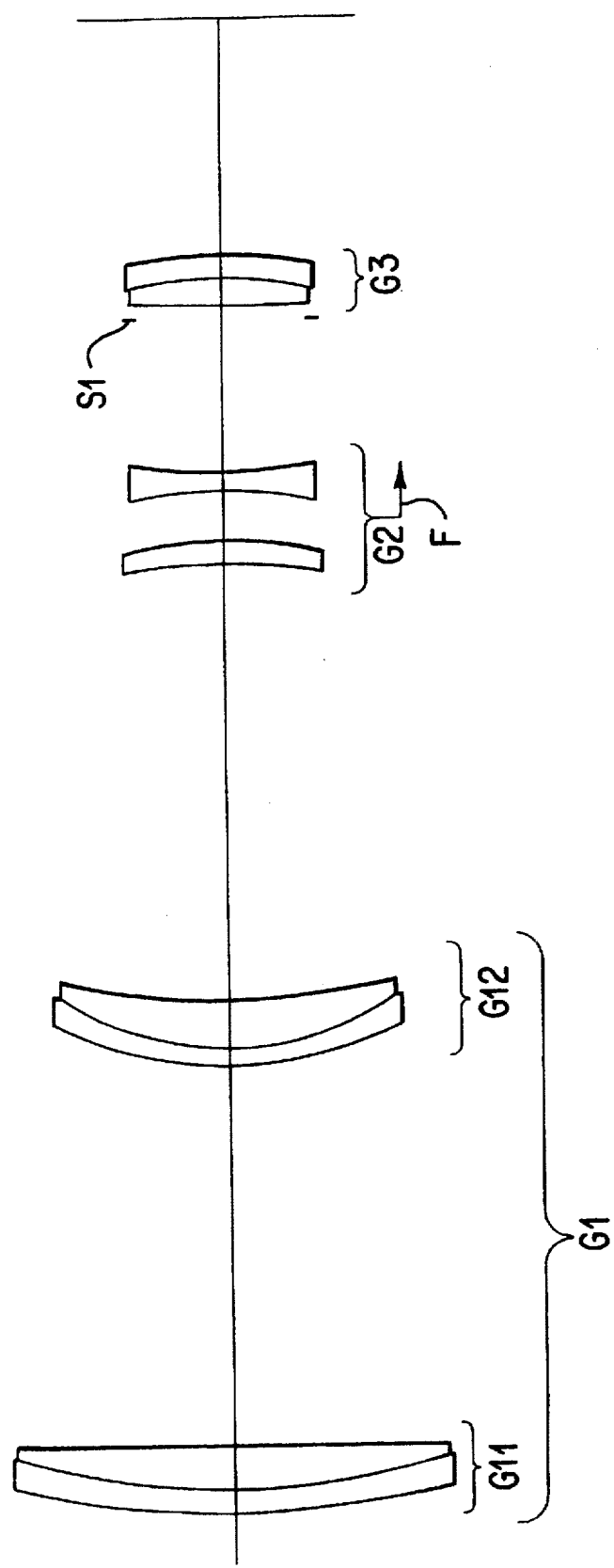
FIG. 10 is a figure which shows the composition of an internal focusing type telephoto lens of a fourth embodiment of the present invention.

FIG. 10 shows the composition of a fourth internal focusing type telephoto lens embodying the invention.

The internal focusing type telephoto lens of FIG. 10 includes, in order from the object side, a front lens group G11, of a first lens group G1, which is made from a positive meniscus lens having a convex surface that faces towards the object side cemented to a negative meniscus lens having a convex surface that faces towards the object side; and a rear lens group G12, of the first lens group G1, which is made from a positive meniscus lens having a convex surface that faces towards the object side cemented to a negative meniscus lens having a convex surface that faces towards the object side. The telephoto lens further includes a second lens group G2, which is made from a positive meniscus lens having a concave surface that faces towards the object side and a double concave lens. The telephoto lens further includes a third lens group G3, which is made from a positive double convex lens cemented to a negative meniscus lens having a concave surface that faces towards the object side. The telephoto lens also includes an aperture stop S1.

FIG. 10 shows the position of each lens group as they occur in the infinite telephoto state of focus. To focus the lens system on a short-range object, the second lens group G2 is moved toward the image side, as shown by arrow F.

Table 4 shows the values for certain parameters of the fourth embodiment. In Table 4, F indicates the focal length of the entire lens system; F NO indicates the F number; β indicates the photographic magnification; Bf indicates the back-focus; and D0 indicates the distance from the object to the first lens surface (object distance). In addition, the numbers at the left end indicate the order of each lens surface from the object side; r indicates the radius of curvature of each lens surface; d indicates the spacing for each lens surface; and n and σ indicate the refractive index against the d line (l=587.6 nm), as well as the Abbe number.

TABLE 4

| F = 392.0 F NO = 5.6 | | | | |
|---|---|---|---|---|
| | r | d | υ | n |
| 1 | 174.8065 | 4.0000 | 40.90 | 1.796310 |
| 2 | 130.7975 | 8.0000 | 82.52 | 1.497820 |
| 3 | −1326.9075 | 65.6000 | | |
| 4 | 68.3567 | 2.9000 | 45.37 | 1.796681 |
| 5 | 49.2108 | 8.0000 | 82.52 | 1.497820 |
| 6 | 105.2777 | d6 = variable | | |
| 7 | −81.8722 | 4.0000 | 27.83 | 1.699110 |
| 8 | −63.2821 | 8.6000 | | |
| 9 | −67.0852 | 3.0000 | 65.77 | 1.464500 |
| 10 | 95.7616 | d10 = variable | | |
| 11 | ∞ | 2.0000 | | |
| 12 | 235.1209 | 5.0000 | 69.98 | 1.518601 |
| 13 | −62.7891 | 3.9000 | 49.45 | 1.772789 |
| 14 | −96.5075 | Bf | | |

| (Variable spacing which occurs at the time of focusing) | | |
|---|---|---|
| | Infinite | Short-range |
| F, β | 392.00000 | −0.11653 |
| D0 | 0.00000 | 3620.4208 |
| d6 | 76.26197 | 97.50104 |
| d10 | 26.42190 | 5.18283 |
| Bf | 161.5928 | 169.5928 |

| (Corresponding Values to the Conditions) | |
|---|---|
| (1) | |f1 · f3/(f2 · F)| = 1.0 |
| (2) | |f2|/f1 = 0.41 |
| (3) | Na = 1.80 |
| (4) | υa = 40.9 |
| (5) | (Rb − Ra)/(Rb + Ra) = −0.14 |
| (6) | f11/f12 = 0.451 |
| (7) | f1/F = 0.682 |
| (8) | Φ/f1 = 0.270 |

In this embodiment, the effective aperture F2 of the second lens group G2 is 33.0, and it can be understood that the effective aperture F2 of the focusing lens group is small.

In addition, when the distance from the object to the image plane is R, and the movement amount of the second lens group G2 at the time of focusing from an infinite telephoto state (R=∞) to the maximum short-range state (R=4000), is 21.24, it can be understood that the focusing movement amount is small.

FIGS. 11A–11E and 12A–12E show aberrations which occur in the infinite telephoto state of focus and the maximum short-range state of focus, respectively. In the aberrational figures, F NO identifies the F number, Y identifies the image height, NA identifies the numerical apertures, d identifies the d line (l=587.6 nm), C identifies the C line (l=656.3 nm), F identifies the F line (l=486.1 nm), and g identifies the g line (l=435.6 nm).

In the aberrational figures that show the astigmatic aberrations, the solid lines show the sagittal image plane and the broken lines show the meridional image plane. In the aberrational figures that show the lateral chromatic aberration, the d line is used as a standard.

As can be seen from each of the aberrational figures, in the fourth embodiment, all aberrations occurring from the infinite telephoto state of focus to the maximum short-range state of focus are favorably corrected.

Embodiment 5

Figure 13:
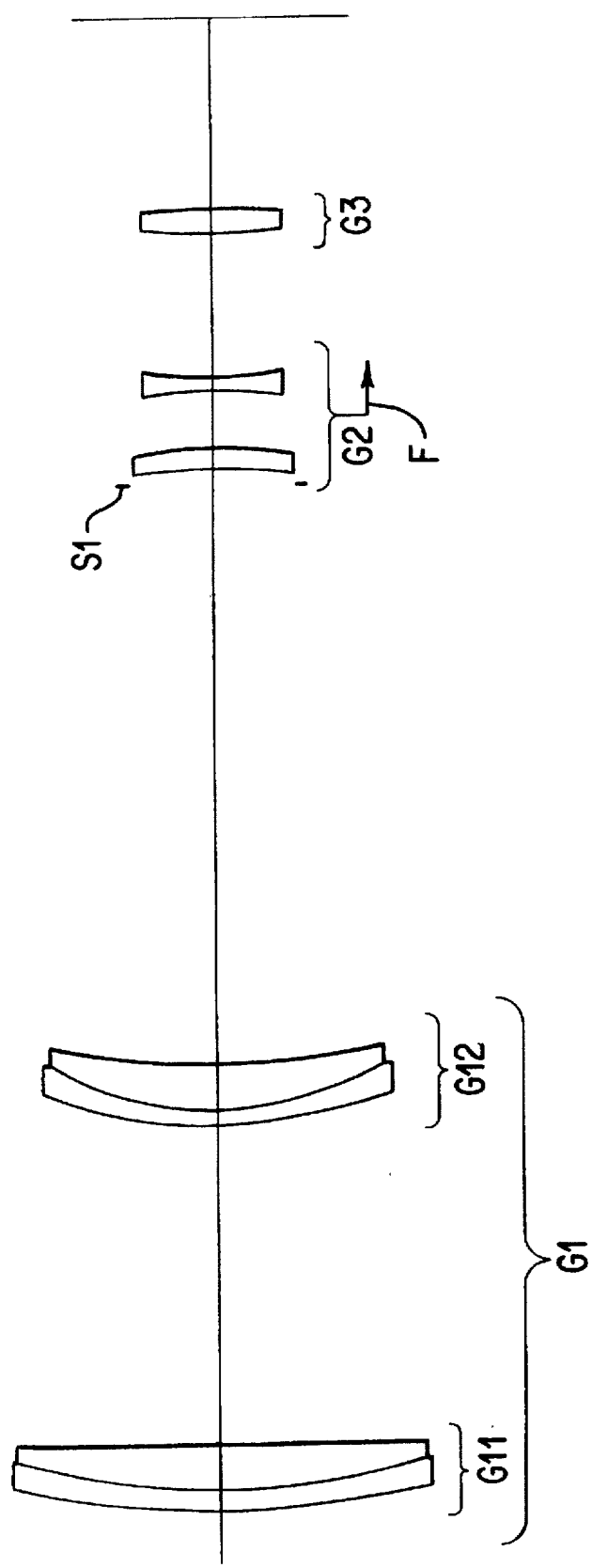
FIG. 13 is a figure which shows the composition of an internal focusing type telephoto lens of a fifth embodiment of the present invention.
Figure 14:
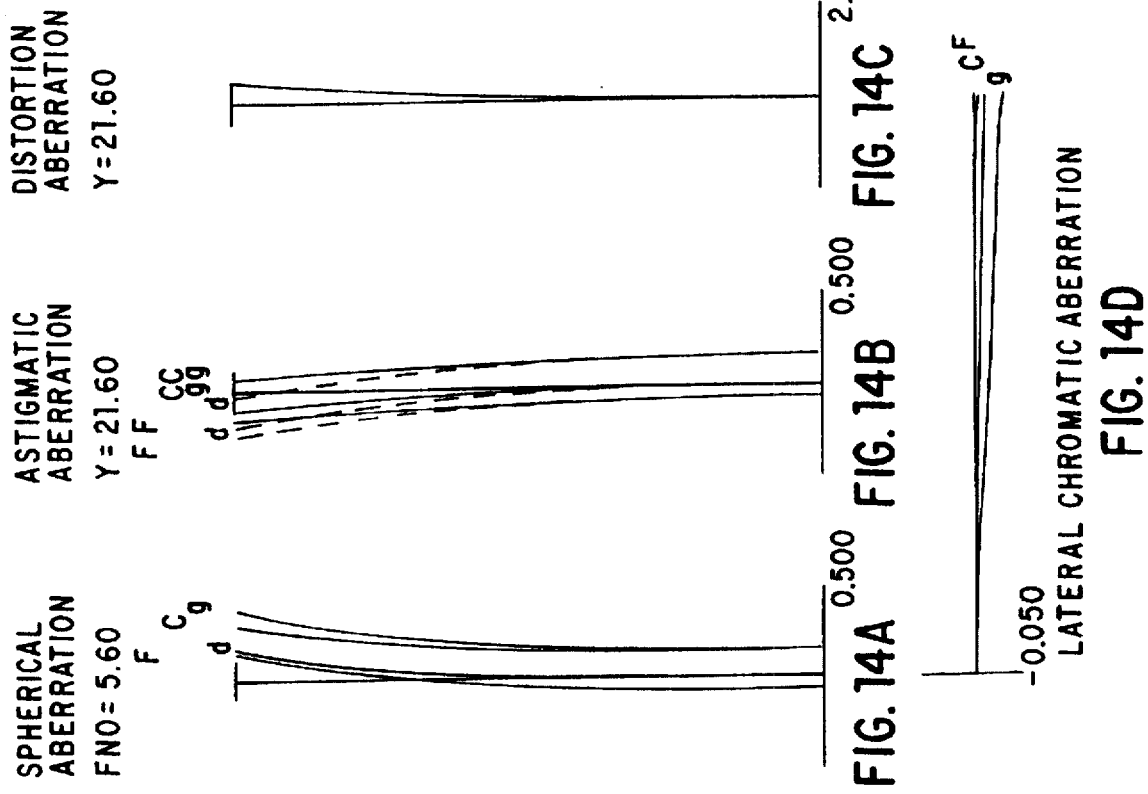
FIGS. 14A–14E show aberrations which occur in the infinite telephoto state of focus of the fifth embodiment.
Figure 15:
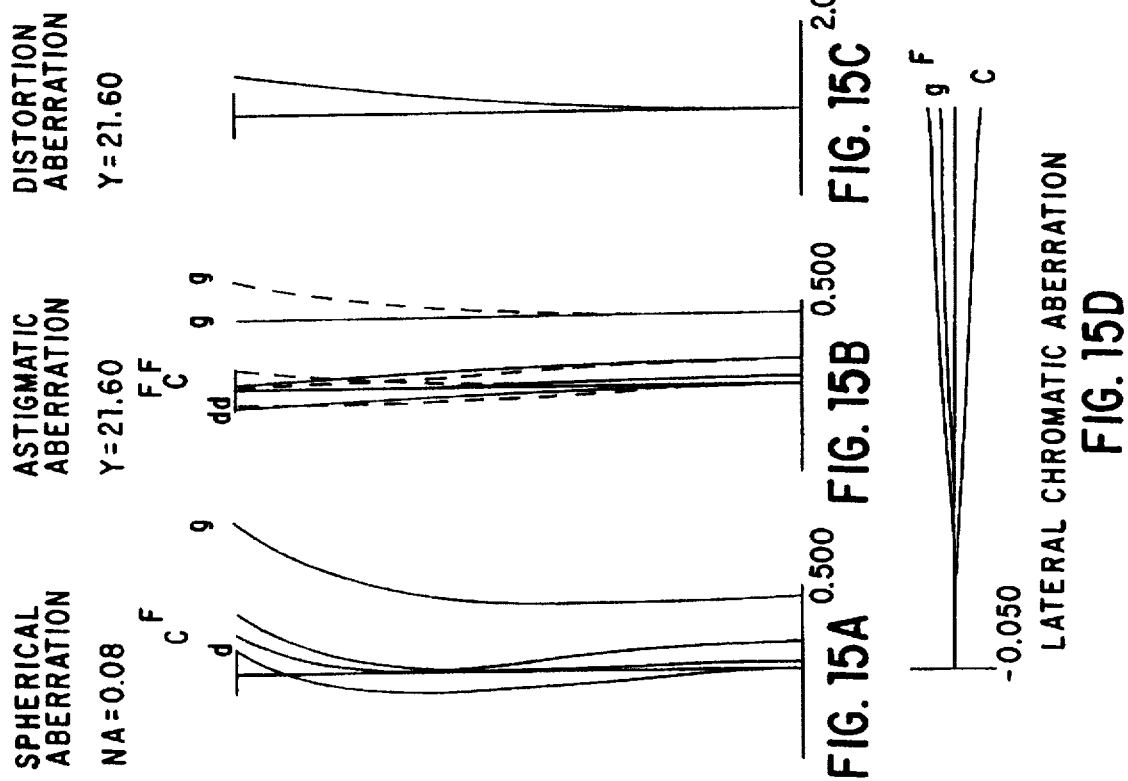
FIGS. 15A–15E show aberrations which occur in the maximum short-range state of focus of the fifth embodiment.

FIG. 13 shows the composition of a fifth internal focusing type telephoto lens embodying the invention.

The internal focusing type telephoto lens of FIG. 13 includes, in order from the object side, a front lens group G11, of a first lens group G1, which is made from a positive meniscus lens having convex surface that faces towards the object side cemented to a negative meniscus lens having a convex surface that faces towards the object side; and a rear lens group G12 of the first lens group G1, which is made from a positive meniscus lens having a convex surface that faces towards the object side cemented to a negative meniscus lens having a convex surface that faces towards the object side. The telephoto lens also includes a second lens group G2, which is made from a positive meniscus lens having a concave surface that faces towards the object side and a double concave lens. The telephoto lens further includes a third lens group G3 which is made from a double convex lens.

FIG. 13 shows the position of each lens group as they occur in the infinite telephoto state of focus. To focus the lens system on a short-range object, the second lens group G2 is moved to the image side, as shown by arrow F.

Table 5 shows values for certain parameters of the fifth embodiment. In Table 5, F indicates the focal length of the entire lens system; F NO indicates the F number; β indicates the photographic magnification; Bf indicates the back-focus; and DO indicates the distance from the object to the first lens surface (object distance). In addition, the numbers at the left end indicate the order of each lens surface from the object side; r indicates the radius of curvature of each lens surface; d indicates the spacing for each lens surface; and n and σ indicate the refractive index against the d line (l=587.6 nm), as well as the Abbe number.

TABLE 5

| | F = 392.0 F NO = 5.6 | | | |
| --- | --- | --- | --- | --- |
| | r | d | ʋ | n |
| 1 | 146.3844 | 4.0000 | 40.90 | 1.796310 |
| 2 | 117.9741 | 8.0000 | 82.52 | 1.497820 |
| 3 | 4017.8299 | 55.0000 | | |
| 4 | 82.2963 | 2.9000 | 40.90 | 1.796310 |
| 5 | 55.4783 | 8.0000 | 69.98 | 1.518601 |
| 6 | 131.2989 | d6 = variable | | |
| 7 | ∞ | 3.0000 | | |
| 8 | −76.3192 | 3.3000 | 23.01 | 1.860741 |
| 9 | −65.6282 | 9.9000 | | |
| 10 | −80.1658 | 2.4000 | 64.10 | 1.516800 |

TABLE 5-continued

| 11 | 76.8116 | d11 = variable | | |
| --- | --- | --- | --- | --- |
| 12 | 129.3711 | 4.0000 | 82.52 | 1.497820 |
| 13 | −129.4865 | Bf | | |

| (Variable spacing which occurs at the time of focusing) | | |
| --- | --- | --- |
| | Infinite | Short-range |
| F, β | 392.00000 | −0.11618 |
| DO | 0.00000 | 3638.4372 |
| d6 | 100.89400 | 122.49994 |
| d11 | 25.11067 | 3.50473 |
| Bf | 129.3239 | 129.3239 |

| (Corresponding Values to the Conditions) | |
| --- | --- |
| (1) | lf1 · f3/(f2 · F)l = 1.0 |
| (2) | lf2l/f1 = 0.33 |
| (3) | Na = 1.80 |
| (4) | ʋa = 40.9 |
| (5) | (Rb − Ra)/(Rb + Ra) = −0.11 |
| (6) | f11/f12 = 0.340 |
| (7) | f1/F = 0.689 |
| (8) | Φ/f1 = 0.259 |

In the fifth embodiment, the effective aperture F2 of the second lens group G2 is 27.1, and it can be understood that the effective aperture F2 of the focusing lens group is small.

In addition, when the distance from the object to the image plane is R, and the movement amount of the second lens group G2 at the time of focusing from an infinite telephoto state (R=∞) to the maximum short-range state (R=4000), is 21.61, it can be understood that the focusing movement amount is small.

FIGS. 14A–14E and 15A–15E show aberrations which occur in the infinite telephoto state of focus and the maximum short-range state of focus, respectively. In the aberrational figures, F NO identifies the F number, Y identifies the image height, NA identifies the numerical apertures, d identifies the d line (l=587.6 nm), C identifies the C line (l=656.3 nm), F identifies the F line (l=486.1 nm), and g identifies the g line (l=435.6 nm).

Moreover, in the aberrational figures that show the astigmatic aberration, the solid lines show the sagittal image plane and the broken lines show the meridional image plane. In the aberrational figures that show the lateral chromatic aberration, the d line is used as a standard.

As can be seen from each of the aberrational figures, in the fifth embodiment, all aberrations occurring from the infinite telephoto state of focus to the maximum short-range state of focus are favorably corrected.

Embodiment 6

Figure 16:
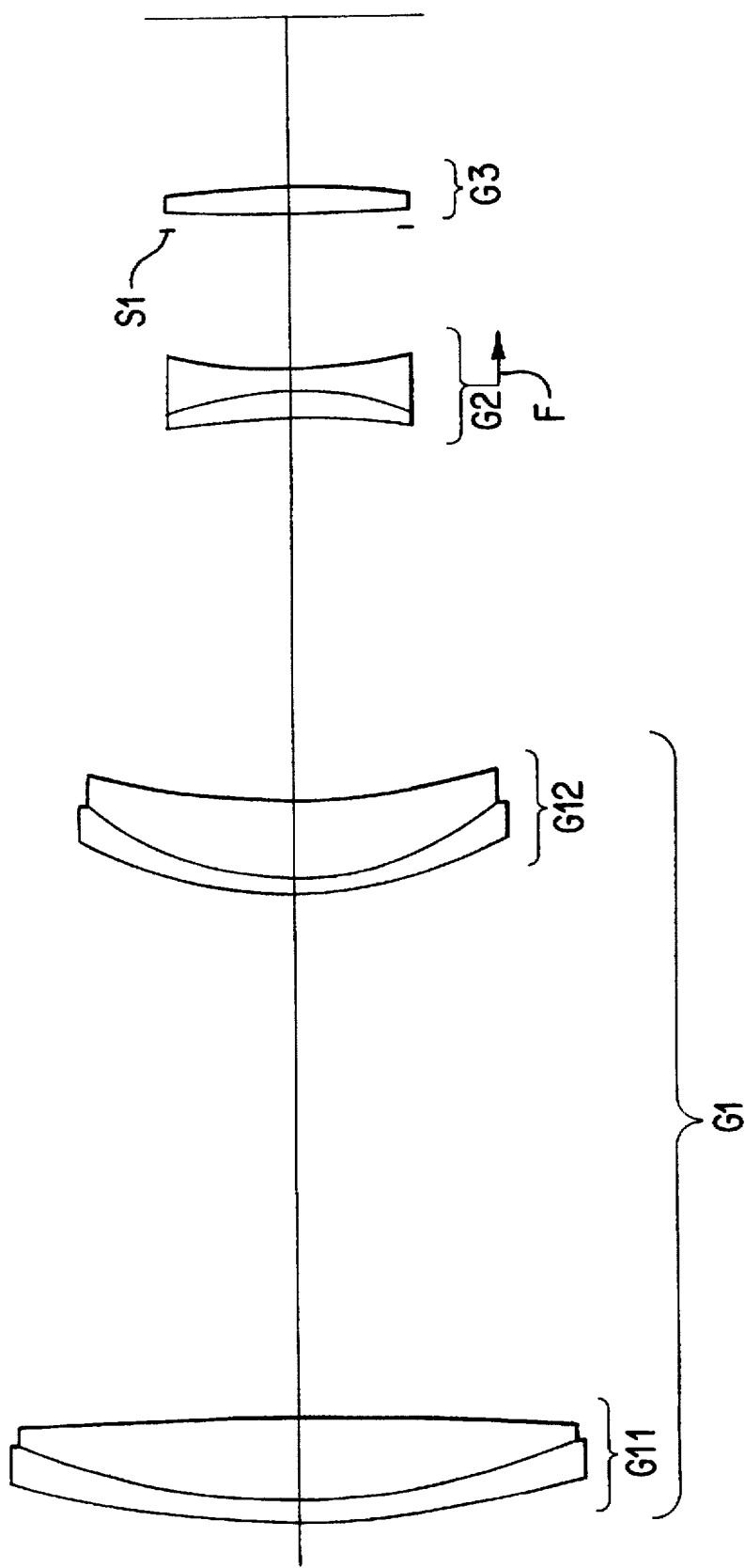
FIG. 16 is a figure which shows the composition of an internal focusing type telephoto lens of a sixth embodiment of the present invention.

FIG. 16 is a figure which shows the composition of a sixth internal focusing type telephoto lens embodying the invention.

The internal focusing type telephoto lens of FIG. 16 includes, in order from the object side, a front lens group G11, of a first lens group G1, which is made from a positive meniscus lens having a convex surface that faces towards the object side cemented to a double convex lens; and a rear lens group G12, of the first lens group G1, which is made from a positive meniscus lens having a convex surface that faces towards the object side cemented to a negative meniscus lens having a convex surface that faces towards the object side. The telephoto lens also includes a second lens group G2, which is made from a positive meniscus lens having a concave surface that faces towards the object side and a double concave lens. The telephoto lens further includes an aperture stop S1 and a third lens group G3, which is made from a double convex lens.

FIG. 16 shows the position of each lens group as they occur in the infinite telephoto state of focus. To focus the lens system on a short-range object, the second lens group G2 is moved to the image side, as shown by arrow F.

Table 5 shows the value for certain parameters of the fifth embodiment. In Table 5, F indicates the focal length of the entire lens system; F NO indicates the F number; β indicates the photographic magnification; Bf indicates the back-focus; and DO indicates the distance from the object to the first lens surface (object distance). In addition, the numbers at the left end indicate the order of each lens surface from the object side; r indicates the radius of curvature of each lens surface; d indicates the spacing for each lens surface; and n and σ indicate the refractive index against the d line (l=587.6 nm), as well as the Abbe number.

TABLE 6

F = 392.0
F NO = 4.08

| | r | d | υ | n |
|---|---|---|---|---|
| 1 | 179.9097 | 4.0000 | 45.37 | 1.796681 |
| 2 | 124.3145 | 14.0000 | 82.52 | 1.497820 |
| 3 | −1110.6798 | 91.9000 | | |
| 4 | 78.2074 | 2.9000 | 40.90 | 1.796310 |
| 5 | 57.4916 | 13.0000 | 82.52 | 1.497820 |
| 6 | 132.1039 | d6 = variable | | |
| 7 | −131.3538 | 5.0000 | 27.83 | 1.699110 |
| 8 | −59.0345 | 3.0000 | 48.97 | 1.531721 |
| 9 | −82.1713 | d9 = variable | | |
| 10 | ∞ | 2.0000 | | |
| 11 | 201.6050 | 5.0000 | 82.52 | 1.497820 |
| 12 | −133.4782 | Bf | | |

(Variable spacing which occurs at the time of focusing)

| | Infinite | Short-range |
|---|---|---|
| F, β | 392.00000 | −0.11633 |
| D0 | 0.00000 | 3626.5595 |
| d6 | 66.53923 | 87.74327 |
| d9 | 24.72125 | 3.51721 |
| Bf | 160.7871 | 160.7871 |

(Corresponding Values to the Conditions)

| | |
|---|---|
| (1) | |f1 · f3/(f2 · F)| = 1.0 |
| (2) | |f2|/f1 = 0.41 |
| (3) | Na = 1.80 |
| (4) | υa = 45.4 |
| (5) | (Rb − Ra)/(Rb + Ra) = −0.18 |
| (6) | f11/f12 = 0.618 |
| (7) | f11/F = 0.682 |
| (8) | Φ/f1 = 0.360 |

In the sixth embodiment, the effective aperture F2 of the second lens group G2 is 41.7, and it can be understood that the effective aperture F2 of the focusing lens group is small.

In addition, when the distance from the object to the image plane is R, and the movement amount of the second lens group G2 at the time of focusing from an infinite telephoto state (R=∞) to the maximum short-range state (R=4000), is 21.20, it can be understood that the focusing movement amount is small.

FIGS. 17A–17E and 18A–18E show aberrations which occur in the infinite telephoto state of focus and the maximum short-range state of focus, respectively. In the aberrational figures, F NO identifies the F number, Y identifies the image height, NA identifies the numerical apertures, d identifies the d line (l=587.6 nm), C identifies the C line (l=656.3 nm), F identifies the F line (l=486.1 nm), and g identifies the g line (l=435.6 nm).

Moreover, in the aberrational figures that show the astigmatic aberrations, the solid lines show the sagittal image plane and the broken lines show the meridional image plane. In the aberrational figures that show the lateral chromatic aberration, the d line is used as a standard.

As can be seen from each of the aberrational figures, in the sixth embodiment, all aberrations occurring from the infinite telephoto state of focus to the maximum short-range state of focus are favorably corrected.

Embodiment 7

Figure 19:
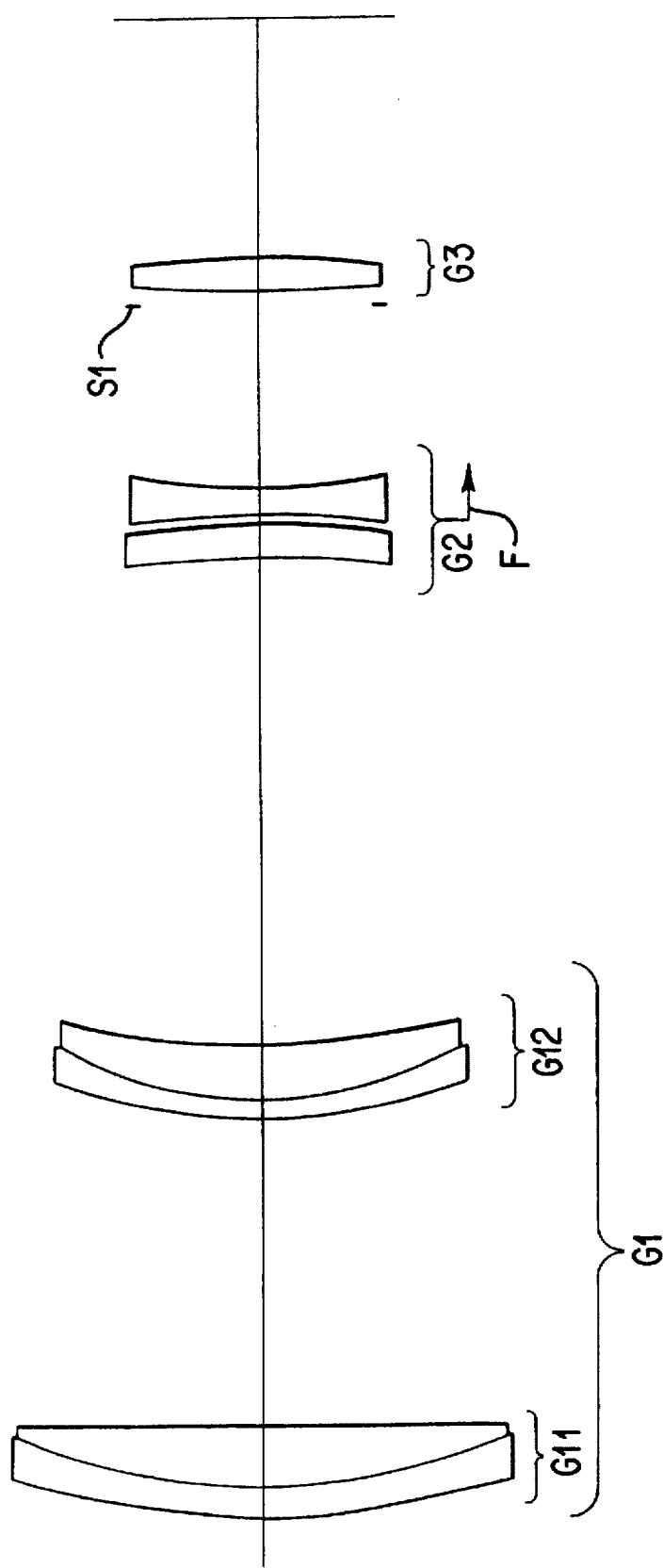
FIG. 19 is a figure which shows the composition of an internal focusing type telephoto lens of a seventh embodiment of the present invention.

FIG. 19 shows the composition of a seventh internal focusing type telephoto lens embodying the invention.

The internal focusing type telephoto lens of FIG. 19 includes, in order from the object side, a front lens group G11, of a first lens group G1, which is made from a positive meniscus lens having a convex surface that faces towards the object side cemented to a double convex lens; and a rear lens group G12, of the first lens group G1, which is made from a positive meniscus lens having a convex surface that faces towards the object side cemented to a positive meniscus lens having a convex surface that faces towards the object side. The telephoto lens also includes a second lens group G2, which is made from a positive meniscus lens having a concave surface that faces towards the object side and a double concave lens. The telephoto lens further includes an aperture stop S1, and a third lens group G3, which is made from a double convex lens.

FIG. 19 shows the position of each lens group as they occur in the infinite telephoto state of focus. To focus the telephoto lens on a short-range object, the second lens group G2 is moved towards the image side, as shown by arrow F.

Table 7 shows the values of certain parameters of the seventh embodiment. In Table 7, F indicates the focal length of the entire lens system; F NO indicates the F number; β indicates the photographic magnification; Bf indicates the back-focus; and DO indicates the distance from the object to the first lens surface (object distance). In addition, the numbers at the left end indicate the order of each lens surface from the object side; r indicates the radius of curvature of each lens surface; d indicates the spacing for each lens surface; and n and σ indicate the refractive index against the d line (l=587.6 nm), as well as the Abbe number.

TABLE 7

F = 392.0
F NO = 5.6

| | r | d | υ | n |
|---|---|---|---|---|
| 1 | 127.9976 | 4.0000 | 52.30 | 1.748099 |
| 2 | 91.0722 | 9.0000 | 82.52 | 1.497820 |
| 3 | −43479.0070 | 44.8000 | | |
| 4 | 84.5144 | 2.9000 | 40.90 | 1.796310 |
| 5 | 57.3091 | 8.0000 | 69.98 | 1.518601 |
| 6 | 120.9867 | d6 = variable | | |
| 7 | −114.1307 | 5.0000 | 23.01 | 1.860741 |
| 8 | −94.8176 | 1.2000 | | |
| 9 | −141.5534 | 3.6000 | 64.10 | 1.516800 |
| 10 | 97.7157 | d10 = variable | | |
| 11 | ∞ | 2.0000 | | |
| 12 | 201.8588 | 5.0000 | 82.52 | 1.497820 |
| 13 | −187.3094 | Bf | | |

TABLE 7-continued

| (Variable spacing which occurs at the time of focusing) | | |
|---|---|---|
| | Infinite | Short-range |
| F, β | 392.00000 | −0.11699 |
| D0 | 0.00000 | 3618.8632 |
| d6 | 70.48853 | 92.24475 |
| d10 | 26.16397 | 4.40775 |
| Bf | 194.3864 | 194.3864 |

| (Corresponding Values to the Conditions) | |
|---|---|
| (1) | $|f1 \cdot f3/(f2 \cdot F)| = 1.0$ |
| (2) | $|f2|/f1 = 0.14$ |
| (3) | $Na = 1.75$ |
| (4) | $\nu a = 52.3$ |
| (5) | $(Rb - Ra)/(Rb + Ra) = -0.17$ |
| (6) | $f11/f12 = 0.116$ |
| (7) | $f1/F = 0.689$ |
| (8) | $\Phi/f1 = 0.259$ |

In the seventh embodiment, the effective aperture F2 of the second lens group G2 is 36.5, and it can be understood that the effective aperture F2 of the focusing lens group is small.

In addition, when the distance from the object to the image plane is R, and the movement amount of the second lens group G2 at the time of focusing from an infinite telephoto state (R=∞) to the maximum short-range state (R=4000), is 21.76, it can be understood that the focusing movement amount is small.

FIGS. 20A–20E and 21A–21E show aberrations which occur in the infinite telephoto state of focus, and the maximum short-range state of focus, respectively. In the aberrational figures, F NO identifies the F number, Y identifies the image height, NA identifies the numerical apertures, d identifies the d line (l=587.6 nm), C identifies the C line (l=656.3 nm), F identifies the F line (l=486.1 nm), and g identifies the g line (l=435.6 nm).

Moreover, in the aberrational figures that show the astigmatic aberration, the solid lines show the sagittal image plane and the broken lines show the meridional image plane. In the aberrational figures that show the lateral chromatic aberration, the d line is used as a standard.

As can be seen from each of the aberrational figures, in the seventh embodiment, all aberrations occurring from the infinite telephoto state of focus to the maximum short-range state of focus are favorably corrected.

Although this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. An internal focusing telephoto lens system, comprising:
   a first lens group G1 of positive refractive power having a focal length f1, wherein a lens element of the first lens group positioned at an extreme object side comprises a convex negative meniscus lens with a refractive power Na, an Abbe number σa, an object side with a radius of curvature Ra, and an image side with a radius of curvature Rb;
   a second lens group G2 of negative refractive power having a focal length f2; and
   a third lens group G3 of positive refractive power having a focal length f3;
   wherein the first lens group G1 and the second lens group G2 form a nearly afocal system;
   wherein the first, second and third lens groups are arranged, in this order, from the object side to an image side, wherein focusing of the lens system is accomplished by moving the second lens group G2 along an optical axis of the lens system, wherein a focal length of the entire lens system is F, and wherein the following conditions are satisfied:

$$0.7 < |(f1 \times f3)/(f2 \times F)| < 1.3;$$

$$0.05 < |f2/f1| < 0.55;$$

$$1.65 < Na;$$

$$30 < \sigma a < 58; \text{ and}$$

$$-1.0 < (Rb-Ra)/(Rb+Ra) < -0.05.$$

2. The lens system of claim 1, wherein the following condition is satisfied:

$$0.10 < |f2/f1| < 0.45.$$

3. The lens system of claim 1, wherein the following condition is satisfied:

$$1.7 < Na.$$

4. The lens system of claim 1, wherein the following condition is satisfied:

$$32 < \sigma a < 53.$$

5. The lens system of claim 1, wherein the following condition is satisfied:

$$-0.8 < (Rb-Ra)/(Rb+Ra) < -0.3.$$

6. The lens system of claim 1, wherein the first lens group G1 comprises:
   a front lens sub-group G11 having a positive refractive power and a focal length f11; and
   a rear lens sub-group G12 having a positive refractive power and a focal length f12;
   wherein the front lens sub-group G11 is arranged on the object side of the first lens group G1; and
   wherein the following condition is satisfied:

$$0.2 < (f11/f12) < 2.5.$$

7. The lens system of claim 6, wherein the following condition is satisfied:

$$0.3 < (f11/f12) < 2.0.$$

8. The lens system of claim 6, wherein the following condition is satisfied:

$$0.35 < (f1/F) < 0.80.$$

9. The lens system of claim 8, wherein the following condition is satisfied:

$$0.40 < (f1/F) < 0.70.$$

10. The lens system of claim 6, wherein an effective aperture of the object side lens surface of the front lens sub-group G11 is φ, and wherein the following condition is satisfied:

$$0.2 < (\phi/f1) < 0.7.$$

11. The lens system of claim 10, wherein the following condition is satisfied:

$$0.23 < (\phi/f1) < 0.40.$$

12. The lens system of claim 6, wherein the front lens sub-group G11 comprises, in order from the object side, a negative meniscus lens with a convex surface facing the object side bonded to a positive lens.

13. The lens system of claim 6, wherein the rear lens sub-group G12 comprises, in order from the object side, a negative meniscus lens with a convex surface facing the object side bonded to B positive meniscus lens having a convex surface facing the object side.

14. The lens system of claim 6, wherein a composite refractive power of the rear lens sub-group G12, the second lens group G2 and the third lens group G3 is positive.

15. The lens system of claim 6, wherein the third lens group G3 is capable of being de-centered with respect to an optical axis of the lens system to displace an image formation position.

16. The lens system of claim 15, further comprising:

a blur detection device that produces a blur signal;

a calculation device that generates a driving signal based on the blur signal; and a driving device that de-centers the third lens group relative to the optical axis of the lens system, based on the driving signal, to correct a blurred condition detected by the blur detection device.

17. The lens system of claim 1, wherein the following condition is satisfied:

$$0.35 < (f1/F) < 0.80.$$

18. The lens system of claim 17, wherein the following condition is satisfied:

$$0.40 < (f1/F) < 0.70.$$

19. The lens system of claim 17, wherein the first lens group G1 comprises a front lens sub-group G11 and a rear lens sub-group G12, wherein an effective aperture of the object side lens surface of the front lens sub-group G11 is φ, and wherein the following condition is satisfied:

$$0.2 < (\phi/f1) < 0.7.$$

20. The lens system of claim 19, wherein the following condition is satisfied:

$$0.23 < (\phi/f1) < 0.40.$$

21. The lens system of claim 17, wherein the first lens group G1 comprises a front lens sub-group G11 and a rear lens sub-group G12, and wherein the front lens sub-group G11 comprises, in order from the object side, negative meniscus lens having a convex surface facing the object side bonded to a positive lens.

22. The lens system of claim 17, wherein the first lens group G1 comprises a front lens sub-group G11 and a rear lens sub-group G12, and wherein the rear lens sub-group G12 comprises, in order from the object side, negative meniscus lens having a convex surface facing the object side bonded to a positive meniscus lens having a convex surface facing the object side.

23. The lens system of claim 17, wherein the first lens group G1 comprises a front lens sub-group G11 and a rear lens sub-group G12, and wherein a composite refractive power of the rear lens sub-group G12, the second lens group G2 and the third lens group G3 is positive.

24. The lens system of claim 17, wherein the third lens group G3 is capable of being decentered with respect to an optical axis of the lens system to displace an image formation position.

25. The lens system of claim 24, further comprising:

a blur detection device that produces a blur signal;

a calculation device that generates a driving signal based on the blur signal; and a driving device that de-centers the third lens group relative to the optical axis of the lens system, based on the driving signal, to correct a blurred condition detected by the blur detection device.

26. The lens system of claim 1, wherein the first lens group G1 comprises a front lens sub-group G11 and a rear lens sub-group G12, wherein the front lens sub-group G11 has a positive refractive power with an effective aperture φ, and wherein the following condition is satisfied:

$$0.2 < (\phi/f1) < 0.7.$$

27. The lens system of claim 26, wherein the following condition is satisfied:

$$0.23 < (\phi/f1) < 0.40.$$

28. The lens system of claim 26, wherein the front lens sub-group G11 comprises, in order from the object side, a negative meniscus lens with a convex surface facing the object side bonded to a positive lens.

29. The lens system of claim 26, wherein the rear lens sub-group G12 comprises, in order from the object side, a negative meniscus lens with a convex surface facing the object side bonded to a positive meniscus lens having a convex surface facing the object side.

30. The lens system of claim 26, wherein a composite refractive power of the rear lens sub-group G12, the second lens group G2 and the third lens group G3 is positive.

31. The lens system of claim 26, wherein the third lens group G3 is capable of being decentered with respect to an optical axis of the lens system to displace an image formation position.

32. The lens system of claim 31, further comprising:

a blur detection device that produces a blur signal;

a calculation device that generates a driving signal based on the blur signal; and a driving device that de-centers the third lens group relative to the optical axis of the lens system, based on the driving signal, to correct a blurred condition detected by the blur detection device.

33. The lens system of claim 1, wherein the first lens group G1 comprises a front lens sub-group G11 and a rear lens sub-group G12, and wherein the front lens subgroup G11 comprises, in order from the object side, a negative meniscus lens with a convex surface facing the object side bonded to a positive lens.

34. The lens system of claim 1, wherein the first lens group G1 comprises a front lens sub-group G11 and a rear lens sub-group G12, and wherein the rear lens subgroup G12 comprises, in order from the object side, a negative meniscus lens with a convex surface facing the object side bonded to a positive meniscus lens having a convex surface facing the object side.

35. The lens system of claim 1, wherein the first lens group G1 comprises a front lens sub-group G11 and a rear lens sub-group G12, and wherein a composite refractive power of the rear lens sub-group G12, the second lens group G2 and the third lens group G3 is positive.

36. The lens system of claim 1, wherein the third lens group G3 is capable of being decentered with respect to an optical axis of the lens system to displace an image formation position.

37. The lens system of claim 36, further comprising:
a blur detection device that produces a blur signal;
a calculation device that generates a driving signal based on the blur signal; and
a driving device that de-centers the third lens group relative to the optical axis of the lens system, based on the driving signal, to correct a blurred condition detected by the blur detection device.

38. The lens system of claim 1, wherein the following condition is satisfied:

$$0.20 < (f1/F) < 0.80.$$

39. The lens system of claim 1, wherein the first lens group G1 comprises:
a front lens sub-group G11 having a positive refractive power and a focal length f11; and
a rear lens sub-group G12 having a positive refractive power and a focal length f12; and
wherein the front lens sub-group G11 is arranged on the object side of the first lens group G1.

* * * * *